(12) United States Patent
Kim et al.

(10) Patent No.: US 10,276,873 B2
(45) Date of Patent: Apr. 30, 2019

(54) CURRENT COLLECTOR FOR BATTERY COMPRISING METAL MESH LAYER AND MANUFACTURING METHOD THEREFOR

(71) Applicant: KOREA INSTITUTE OF MACHINERY & MATERIALS, Yuseong-gu, Daejeon (KR)

(72) Inventors: Man Kim, Changwon-si (KR); Joo Yul Lee, Gimhae-si (KR); Sang Yeoul Lee, Gimhae-si (KR); Yong Soo Jeong, Changwon-si (KR); Do Yon Chang, Changwon-si (KR); Kyu Hwan Lee, Changwon-si (KR); Cheol Nam Yang, Changwon-si (KR); Chang Rae Lee, Changwon-si (KR); Seong Bong Yim, Changwon-si (KR); Dong Chan Lim, Yangcheon-gu Seoul (KR); Jae Hong Lim, Changwon-si (KR); Young Sup Song, Dong-gu Daejeon (KR); Sung Mo Moon, Changwon-si (KR); Su Sub Cha, Changwon-si (KR)

(73) Assignee: KOREA INSTITUTE OF MACHINERY & MATERIALS, Yuseong-gu, Daejon ( * ) Notice: Subject to any disclaimer, the term of this patent is extended or adjusted under 35 U.S.C. 154(b) by 428 days.

(21) Appl. No.: 14/399,749

(22) PCT Filed: Apr. 22, 2013

(86) PCT No.: PCT/KR2013/003371
§ 371 (c)(1),
(2) Date: Nov. 7, 2014

(87) PCT Pub. No.: WO2013/168910
PCT Pub. Date: Nov. 14, 2013

(65) Prior Publication Data
US 2015/0125756 A1    May 7, 2015

(30) Foreign Application Priority Data

May 9, 2012 (KR) .................. 10-2012-0049224
May 9, 2012 (KR) .................. 10-2012-0049228
(Continued)

(51) Int. Cl.
*H01M 4/74* (2006.01)
*H01M 4/04* (2006.01)
(Continued)

(52) U.S. Cl.
CPC ........... *H01M 4/74* (2013.01); *H01M 4/0402* (2013.01); *H01M 4/043* (2013.01); *H01M 4/045* (2013.01);
(Continued)

(58) Field of Classification Search
None
See application file for complete search history.

(56) References Cited

U.S. PATENT DOCUMENTS 5,223,354 A * 6/1993 Senoo .................. H01M 4/745
429/242
8,173,304 B2    5/2012 Kami et al.
(Continued)

FOREIGN PATENT DOCUMENTS

JP    06-302319    10/1994
JP    10-172539    6/1998
(Continued)

OTHER PUBLICATIONS

Office Action issued by the Japan Patent Office for corresponding Japanese Patent Application No. 2015-511348, dated Jan. 12, 2016.
(Continued)

*Primary Examiner* — Jonathan G Leong
*Assistant Examiner* — Christopher P Domone
(74) *Attorney, Agent, or Firm* — Myers Wolin, LLC

(57) ABSTRACT

Provided are a current collector for a battery, including: a base material; adhesive layers positioned on the base material; and metal mesh layers positioned on the adhesive layers, in which the metal mesh layer includes a plurality of metal mesh patterns, and holes positioned between the metal mesh patterns, and a method of manufacturing the same. An active material is applied onto the metal mesh layer through the holes of the metal mesh layer, and thus a contact area of the metal mesh layer and the active material is increased, so that it is possible to restrict the active material from being deintercalated from the current collector and improve a cycle lifespan property of a battery.

13 Claims, 23 Drawing Sheets

(30) Foreign Application Priority Data

| | | | |
|---|---|---|---|
| May 9, 2012 | (KR) | ..................... | 10-2012-0049231 |
| May 9, 2012 | (KR) | ..................... | 10-2012-0049234 |

(51) Int. Cl.
*H01M 4/66* (2006.01)
*H01M 10/0525* (2010.01)

(52) U.S. Cl.
CPC .......... *H01M 4/661* (2013.01); *H01M 4/667* (2013.01); *H01M 4/0404* (2013.01); *H01M 10/0525* (2013.01); *H01M 2220/30* (2013.01); *Y10T 156/10* (2015.01)

(56) References Cited

U.S. PATENT DOCUMENTS

| | | | | |
|---|---|---|---|---|
| 8,586,248 | B2* | 11/2013 | Mack | ................ H01M 2/1613 |
| | | | | 429/211 |
| 2005/0064291 | A1 | 3/2005 | Sato et al. | |
| 2008/0131779 | A1 | 6/2008 | Kami et al. | |
| 2008/0187824 | A1* | 8/2008 | Tomantschger | ........ H01M 4/14 |
| | | | | 429/122 |
| 2009/0202908 | A1 | 8/2009 | Sumihara et al. | |
| 2011/0070493 | A1 | 3/2011 | Gadkaree et al. | |
| 2012/0115035 | A1* | 5/2012 | Ota | ........................ H01M 4/70 |
| | | | | 429/241 |

FOREIGN PATENT DOCUMENTS

| | | | |
|---|---|---|---|
| JP | 11-323593 | A | 11/1999 |
| JP | 2002-151087 | A | 5/2002 |
| JP | 2004-253243 | | 9/2004 |
| JP | 2006-338903 | A | 12/2006 |
| JP | 2006338903 | * | 12/2006 |
| JP | 2009-123664 | | 6/2009 |
| JP | 2009-301898 | | 12/2009 |
| KR | 10-2008-0061218 | | 7/2008 |
| WO | 99/054945 | A1 | 10/1999 |

OTHER PUBLICATIONS

Extended European search report with supplementary European search report and the European search opinion issued by the European Patent Office for corresponding European Patent Application No. 13787354.3, dated Mar. 2, 2016.

International Search Report issued for corresponding International Patent Application No. PCT/KR2013/003371, dated Sep. 4, 2013, with an English Translation.

Office Action issued for corresponding Korean application No. 10-2012-0049231 dated Sep. 5, 2013, with an English translation.

Notice of Allowance for corresponding Korean application No. 10-2012-0049228 dated Mar. 31, 2014.

* cited by examiner

— 330a

— 430a

CURRENT COLLECTOR FOR BATTERY COMPRISING METAL MESH LAYER AND MANUFACTURING METHOD THEREFOR

CROSS-REFERENCE TO RELATED APPLICATION

The present disclosure is a national phase filing under 35 U.S.C. § 371 of International Patent Application No. PCT/KR2013/003371, filed on Apr. 22, 2013, which claims priority to Korean Patent Application No. 10-2012-0049224 filed on May 9, 2012, Korean Patent Application No. 10-2012-0049228 filed on May 9, 2012, Korean Patent Application No. 10-2012-0049231 filed on May 9, 2012 and Korean Patent Application No. 10-2012-0049234 filed on May 9, 2012 in the Korean Intellectual Property Office, and all the benefits accruing therefrom under 35 U.S.C. 119, the disclosures of each of which are expressly incorporated herein by reference in their entireties.

TECHNICAL FIELD

The present invention relates to a current collector for a battery including a metal mesh layer, and a method of manufacturing the same, and more particularly, to a current collector for a battery including a metal mesh layer, which is capable of preventing an active material from being deintercalated, and a method of manufacturing the same.

BACKGROUND

Recently, portable electronic devices have become rapidly small and light, so that a demand for a small and high capacity battery used as a driving power source thereof has increased. Particularly, an operational voltage of a lithium rechargeable battery has 3.6 V or more, which is three times higher than that of a nickel-cadmium battery or a nickel-hydrogen battery widely used as a power source of a portable electronic device, and the energy density per unit weight thereof is high, so that the lithium rechargeable battery has rapidly expanded.

The lithium rechargeable battery generates electric energy by oxidation and reduction reactions when lithium ions are intercalated and deintercalated in a positive electrode and a negative electrode. The lithium rechargeable battery uses a material, which is capable of reversibly intercalating and deintercalating lithium ions, as an active material of the positive electrode and the negative electrode, and is manufactured by charging an organic electrolyte or a polymer electrolyte between the positive electrode and the negative electrode.

The lithium rechargeable battery includes an electrode assembly, in which a negative electrode plate and a positive electrode plate are wound in a predetermined shape, for example, a jelly-roll shape, with a separator interposed therebetween, a can, in which the electrode assembly and an electrolyte are accommodated, and a cap assembly coupled to an upper part of the can.

In this case, the negative electrode plate and the positive electrode plate may be formed by coating the active materials, that is, a negative electrode active material and a positive electrode active material, on the current collectors, for example, a negative electrode current collector and a positive electrode current collector, respectively.

However, the lithium rechargeable battery has a problem in that the active materials are deintercalated from the current collectors due to charging and discharging which are repeated several tens to several hundreds of times, so that battery efficiency deteriorates.

SUMMARY

The present invention has been made in an effort to provide a method of manufacturing a current collector for a rechargeable battery, which is capable of preventing a positive electrode active material or a negative electrode active material from being deintercalated from a negative electrode current collector or a positive electrode current collector.

The objects of the present invention are not limited to the aforementioned object, and other objects, which are not mentioned above, will be apparently understood by a person skilled in the art from the following description.

An embodiment of the present invention provides a current collector for a battery, including: a base material; adhesive layers positioned on the base material; and metal mesh layers positioned on the adhesive layers, in which the metal mesh layer includes a plurality of metal mesh patterns, and holes positioned between the metal mesh patterns.

Another embodiment of the present invention provides a method of manufacturing a current collector for a battery, including: providing a base material; providing metal mesh layers including a plurality of metal mesh patterns and holes positioned between the metal mesh patterns; and forming adhesive layers on the base material; and positioning and compressing the metal mesh layers onto the adhesive layers.

Still another embodiment of the present invention provides a current collector for a battery, including: a base material; metal mesh layers positioned on the base material; and adhesive layers positioned between the base material and the metal mesh layers, in which the metal mesh layer includes a plurality of metal mesh patterns, and holes positioned between the metal mesh patterns.

Yet another embodiment of the present invention provides a method of manufacturing a current collector for a battery, including: providing a base material; providing metal mesh layers including a plurality of metal mesh patterns and holes positioned between the metal mesh patterns; forming adhesive layers on the metal mesh layers; and positioning and compressing the adhesive layers onto the base material.

According to the embodiments of the present invention, the active material is applied onto the metal mesh layer through the holes of the metal mesh layer, and thus a contact area of the metal mesh layer and the active material is increased, thereby restricting the active material from being deintercalated from the current collector and improving a cycle lifespan property of a battery.

According to the embodiments of the present invention, the active material is also applied onto the adhesive layer through the holes positioned between the metal mesh patterns, so that it is possible to more firmly apply the active material according to an adhesive property of the adhesive layer.

BRIEF DESCRIPTION OF THE DRAWINGS

The above and other features and advantages of the present invention will become more apparent by describing in detail embodiments thereof with reference to the attached drawings in which.

DETAILED DESCRIPTION OF THE EMBODIMENTS

Figure 1:
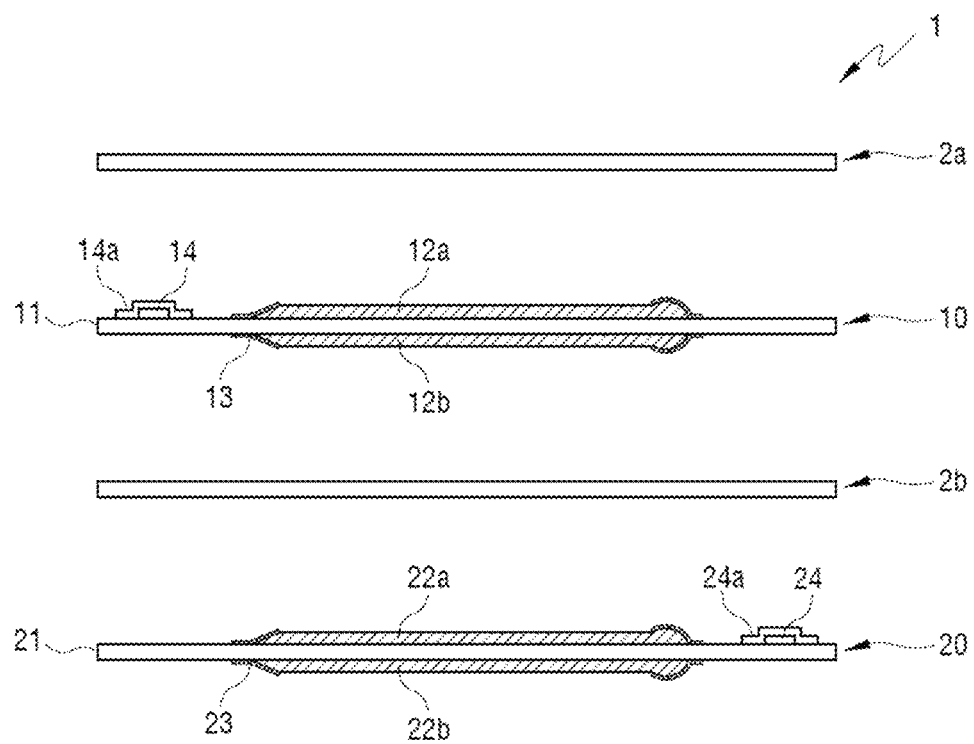
FIG. 1 is an exploded cross-sectional view illustrating an electrode assembly of a general lithium rechargeable battery.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Hereinafter, embodiments of the present invention will be described in detail with reference to the accompanying drawings.

FIG. 1 is an exploded cross-sectional view illustrating an electrode assembly of a general lithium rechargeable battery.

Referring to FIG. 1, an electrode assembly 1 of a general lithium rechargeable battery includes a first electrode 10 (hereinafter, referred to as a positive electrode), a second electrode 20 (hereinafter, referred to as a negative electrode), and separators 2a and 2b.

In this case, the electrode assembly 1 may be formed in a jelly roll type in which the positive electrode 10, the negative electrode 20, and the separators 2a and 2b are stacked and wound.

Hereinafter, a configuration of the electrode assembly will be described below.

First, the separators may include a first separator 2b positioned between the positive electrode 10 and the negative electrode 20, and a second separator 2a positioned at a lower side or an upper side of the two electrodes 10 and 20, and the separators 2a and 2b are interposed at a part, at which the two stacked and wound electrodes are in contact with each other, to prevent a short circuit between the two electrodes. In this case, the separator may be formed of a thermoplastic resin, such as polyethylene (PE) and polypropylene (PP), but a material of the separator is not limited thereto in the present invention.

Next, the positive electrode 10 includes a positive electrode current collector 11 for collecting electrons generated by a chemical reaction and transferring the collected electrons to an external circuit, and positive electrode active material layers 12a and 12b formed by applying a slurry for the positive electrode including the positive electrode active material onto one surface or both surfaces of the positive electrode current collector 11.

The positive electrode 10 may include an insulating member 13 formed to cover at least one end of both distal ends of the positive electrode active material layers 12a and 12b.

A positive electrode uncoated part, in which the slurry for the positive electrode including the positive electrode active material is not applied onto one side or both sides of both distal ends of the positive electrode current collector 11, so that the positive electrode current collector 11 is exposed as it is, is formed, and a positive electrode tap 14, which may transfer the electrons collected in the positive electrode current collector 11 to the external circuit, and be formed by a thin plate made of nickel or aluminum, is bonded to the positive electrode uncoated part.

In this case, a protection member 14a may be provided on an upper surface of the part to which the positive electrode tap 14 is bonded.

Stainless steel, nickel, aluminum, titanium, or an alloy thereof, aluminum or stainless steel surface-processed with carbon, nickel, titanium, and silver, and the like may be used as the positive electrode current collector 11, and aluminum or an aluminum alloy among them is preferable, and a material of the positive electrode current collector 11 is not limited in the present invention.

The positive electrode active material of the positive electrode active material layer includes a positive electrode active material which is capable of reversibly intercalating or deintercalating lithium ions, and a representative example of the positive electrode active material is a lithium-transition metal oxide, such as $LiCoO_2$, $LiNiO_2$, $LiMnO_2$, $LiMn_2O_4$, or $LiNi1-x-yCoxMyO_2$ ($0 \leq x \leq 1, 0 \leq y \leq 1, 0 \leq x+y \leq 1$, M is metal, such as Al, Sr, Mg, and La), but the type of positive electrode active material is not limited in the present invention.

Next, the negative electrode 20 includes a negative electrode current collector 21 for collecting electrons generated by a chemical reaction and transferring the collected electrons to an external circuit, and negative electrode active material layers 22a and 22b formed by applying a slurry for the negative electrode including the negative electrode active material onto one surface or both surfaces of the negative electrode current collector 21.

The negative electrode 20 may include an insulating member 23 formed to cover at least one end of both distal ends of the negative electrode active material layers 22a and 22b.

A negative electrode uncoated part, in which the slurry for the negative electrode including the negative electrode active material is not applied onto one side or both sides of both distal ends of the negative electrode current collector 21, so that the negative electrode current collector 21 is exposed as it is, is formed, and a negative electrode tap 24, which may transfer the electrons collected in the negative electrode current collector 21 to the external circuit, and be formed by a thin plate made of nickel, is bonded to the negative electrode uncoated part.

A protection member 24a may be provided on an upper surface of the part to which the negative electrode tap 24 is bonded.

Stainless steel, nickel, copper, titanium, or an alloy thereof, copper or stainless steel surface-processed with carbon, nickel, titanium, and silver, and the like may be used as the negative electrode current collector 21, and copper or a copper alloy among them is preferable, and a material of the negative electrode current collector 23a is not limited in the present invention.

The negative electrode active material of the negative electrode active material layer includes a negative electrode active material which is capable of intercalating and deintercalating lithium ions, and crystalline or amorphous carbon, or a carbon based negative electrode active material of a carbon complex may be used as the negative electrode active material, but the type of negative electrode active material is not limited in the present invention.

As described above, the active materials, that is, the negative electrode active material and the positive electrode active material, are coated on the current collectors, for example, the negative electrode current collector and the positive electrode current collector, respectively, so that the negative electrode and the positive electrode serve as a rechargeable battery.

However, charging and discharging are repeated several tens to several hundreds of times in the rechargeable battery, and the active material is deintercalated from the current collector due to degradation of the active material according to the repeat of the charging and the discharging, so that there is a problem in deterioration of battery efficiency.

Hereinafter, a structure of the current collector for the rechargeable battery according to the present invention will be described. In this case, the current collector for the rechargeable battery according to the present invention may be the negative electrode current collector or the positive electrode current collector which is described above, and the rechargeable battery in the present invention has a concept including all kinds of rechargeable battery capable of repeating charging and discharging, and may be, for example, the rechargeable battery including the electrode assembly illustrated in FIG. 1.

Figure 2:
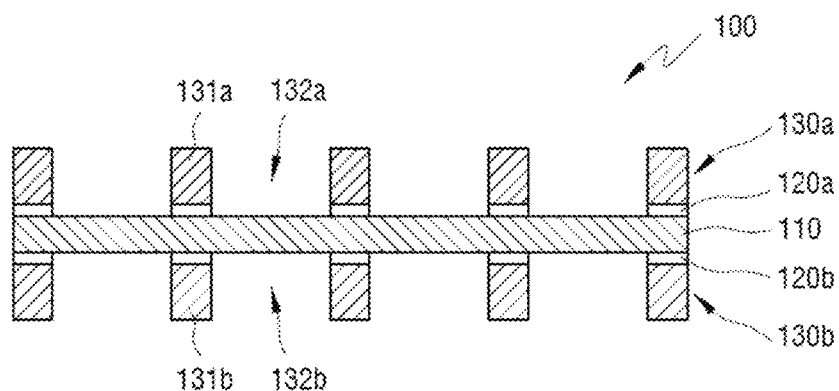
FIG. 2 is a cross-sectional view illustrating a current collector for a rechargeable battery according to a first embodiment of the present invention.
Figure 3:
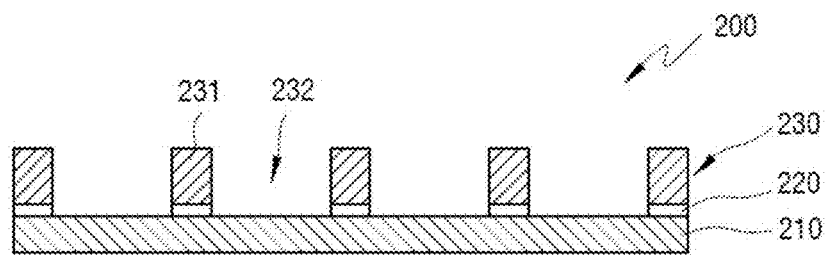
FIG. 3 is a cross-sectional view illustrating a current collector for a rechargeable battery according to a second embodiment of the present invention.

FIG. 2 is a cross-sectional view illustrating a current collector for a rechargeable battery according to a first embodiment of the present invention, and FIG. 3 is a cross-sectional view illustrating a current collector for a rechargeable battery according to a second embodiment of the present invention.

First, referring to FIG. 2, a current collector 100 for a rechargeable battery according to a first embodiment of the present invention includes a base material 110.

The base material 110 may be varied according to whether the current collector is a positive electrode current collector or a negative electrode current collector.

For example, when the current collector is the positive electrode current collector, the base material 110 may use stainless steel, nickel, aluminum, titanium, or an alloy thereof, aluminum or stainless steel surface-processed with carbon, nickel, titanium, and silver, and among them, aluminum or an aluminum alloy may be preferable.

When the current collector is the negative electrode current collector, the base material 110 may use stainless steel, nickel, copper, titanium, or an alloy thereof, copper or stainless steel surface-processed with carbon, nickel, titanium, and silver, and among them, copper or a copper alloy may be preferable.

Subsequently, referring to FIG. 2, the current collector 100 for the rechargeable battery according to the first embodiment of the present invention includes a first adhesive layer 120a positioned on a first surface of the base material 110, and a second adhesive layer 120b positioned on a second surface of the base material 110.

The first adhesive layer 120a and the second adhesive layer 120b are provided for attaching a metal mesh layer, which is to be described below, onto the base material 110, and the first adhesive layer and the second adhesive layer may be solder layers, and in this case, the solder layer may be formed of lead (Pb), tin (Sn), zinc (Zn), indium (In), cadmium (Cd), bismuth (Bi), and an alloy thereof.

Subsequently, referring to FIG. 2, the current collector 100 for the rechargeable battery according to the first embodiment of the present invention includes a first metal mesh layer 130a positioned on the first adhesive layer 120a and a second metal mesh layer 130b positioned on the second adhesive layer 120b.

The metal mesh layers 130a and 130b may be formed of at least one material among copper (Cu), silver (Ag), chrome (Cr), nickel (Ni), iron (Fe), cobalt (Co), and an alloy thereof, but a material of the metal mesh layer is not limited in the present invention.

However, it is preferable that the metal mesh layer serves as a unique current collector of the rechargeable battery in the present invention, so that when the current collector is the positive electrode current collector, the metal mesh layer is preferably aluminum or an aluminum alloy, and when the current collector is the negative electrode current collector, the metal mesh layer is preferably copper or a copper alloy.

In this case, the first metal mesh layer 130a includes a plurality of first metal mesh patterns 131a and first holes 132a positioned between the first metal mesh patterns 131a, and the second metal mesh layer 130b includes a plurality of second metal mesh patterns 131b and second holes 132b positioned between the second metal mesh patterns 131b.

That is, the current collector 100 for the rechargeable battery according to the first embodiment of the present invention includes the metal mesh layers 130a and 130b formed on the first surface and the second surface of the base material 110, respectively, and each of the metal mesh layers includes a plurality of metal mesh patterns 131a and 131b, and holes 132a and 132b positioned between the metal mesh patterns, respectively, and in this case, the current collector 100 include adhesive layers 120a and 120b for attaching the base material and the metal mesh layers.

As described above, the active material is deintercalated from the current collector due to degradation of the active material according to the repeat of charging and discharging several tens to several hundreds of times in the rechargeable battery having a general structure, so that battery efficiency deteriorates.

However, in the present invention, since the metal mesh layers are attached onto the current collector, on which the active material is coated, more particularly, the base material, through the adhesive layers, and the metal mesh layers include the holes 132a and 132b positioned between the metal mesh patterns, the active material is applied onto the metal mesh layers through the holes 132a and 132b, and thus contact areas of the metal mesh layers and the active material are increased, thereby restricting the active material from being deintercalated from the current collector and improving a cycle lifespan property of the battery.

In the present invention, the active material is applied onto the metal mesh layers, and in this case, and the active material is applied onto the adhesive layers through the holes positioned between the metal mesh patterns, so that the active material may be more firmly applied according to an adhesive property of the adhesive layer.

Next, referring to FIG. 3, a current collector 200 for a rechargeable battery according to a second embodiment of the present invention includes a base material 210, an adhesive layer 220 positioned on the base material 210, and a metal mesh layer 230 positioned on the adhesive layer 220.

The metal mesh layer 230 includes a plurality of metal mesh patterns 231, and holes 232 positioned between the metal mesh patterns 231.

As described above, in the rechargeable battery, for example, in a positive electrode, a positive electrode active material may be applied onto one surface or both surfaces of a positive electrode current collector.

That is, the current collector 200 for the rechargeable battery according to the second embodiment of the present invention is an embodiment in which the metal mesh layer 230 is formed on only one surface of the base material 210, so that the metal mesh layer may be formed on a first surface and/or a second surface of the base material in the present invention.

The current collector for the rechargeable battery according to the second embodiment of the present invention may be the same as the current collector for the rechargeable battery according to the first embodiment of the present invention except for the described matter, so that a detailed description thereof will be omitted below.

MODE FOR CARRYING OUT THE INVENTION

Hereinafter, a method of manufacturing the current collector for the rechargeable battery according to the present invention will be described.

Figure 4:
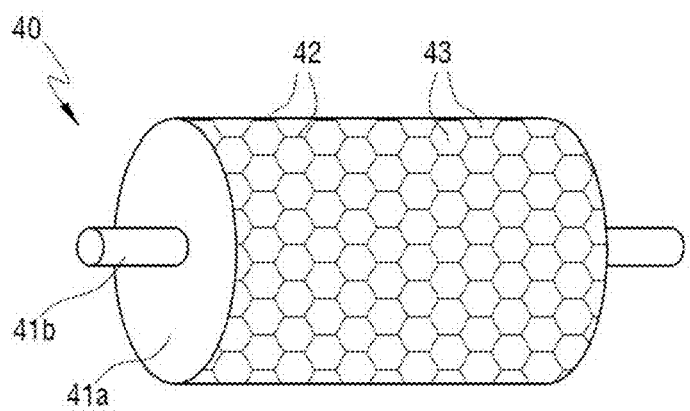
FIG. 4 is a perspective view schematically illustrating a mesh type negative electrode drum of a metal mesh manufacturing device according to the present invention.
Figure 5:
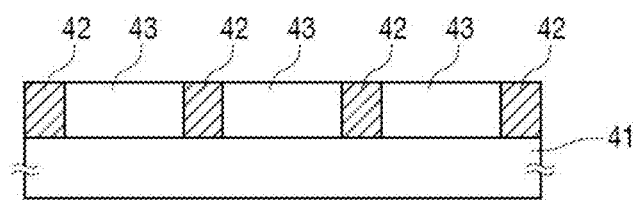
FIG. 5 is a cross-sectional view illustrating a part of the mesh type negative electrode drum.
Figure 6:
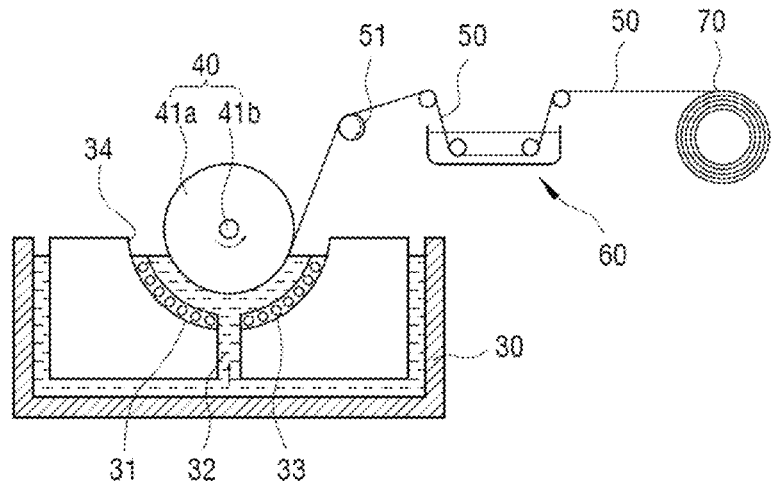
FIG. 6 is a configuration diagram schematically illustrating a continuous electroforming device for manufacturing a metal mesh according to the present invention.
Figure 7:
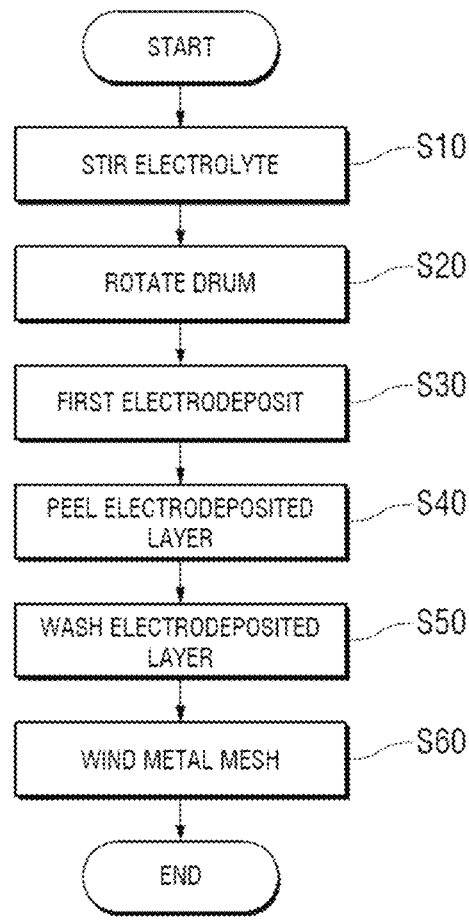
FIG. 7 is a process flowchart illustrating a method of manufacturing the metal mesh according to the present invention.

FIG. 4 is a perspective view schematically illustrating a mesh type negative electrode drum of a metal mesh manufacturing device according to the present invention, FIG. 5 is a cross-sectional view illustrating a part of the mesh type negative electrode drum, FIG. 6 is a configuration diagram schematically illustrating a continuous electroforming device for manufacturing a metal mesh according to the present invention, and FIG. 7 is a process flowchart illustrating a method of manufacturing the metal mesh according to the present invention.

First, referring to FIGS. 4 and 5, a mesh type negative electrode drum 40 of a metal mesh manufacturing device according to the present invention includes a rotation shaft 41b serving as a center based on which the mesh type negative electrode drum 40 is rotatable, and a cylindrical drum 41a having a predetermined width while surrounding the rotation shaft 41b.

In this case, a chain connected with a motor, which provides rotational force so that the drum 41a is rotated, may be coupled to one end of the rotation shaft 41b.

In the meantime, a mesh 42 having a shape desired to be fabricated is formed on a surface of the drum 40. In this case, the mesh 42 may be formed in a net shape, in which a plurality of approximate hexagons is connected, to be shaped like a honeycomb, but the shape of the mesh may be a quadrangle, a triangle, a pentagon, and the like, so that the shape of the mesh is not limited in the present invention.

The mesh 42 may be formed of single metal or an alloy according to a component of an electrolyte for plating, and may be used by directly processing a surface of the cylindrical drum 41a and integrally forming the cylindrical drum 41a and the mesh 42, or attaching a mesh 50, which is processed in a weaving type or a batch type formed by weaving metal wires similar to weaving threads, to the surface of the cylindrical drum 41a.

Continuously, referring to FIGS. 4 and 5, an insulating layer 43 is formed in spaces between the meshes 42, and the insulating layer may be a plastic resin, such as an epoxy resin, a Teflon-based resin, or a fluoride resin.

In this case, the insulating layer 43 in the spaces between the meshes may be formed by forming the mesh 42 having the shape, which is desired to be fabricated, on the surface of the cylindrical drum 41a as described above, applying an insulating material by a publicly known spray method or deposition method, and planarizing a cross section of the mesh by using a publicly known chemical mechanical polishing (CMP) process.

Then, through the mesh type negative electrode drum 40, the metal mesh may be formed by an electroforming process by forming a metal mesh layer (not illustrated) on the mesh 42 of the surface of the mesh type negative electrode drum by the electroforming process and peeling the metal mesh layer (not illustrated).

In the meantime, the mesh type negative electrode drum is an electroforming master, and the electroforming master in the present invention collectively refers to all of the members including a mesh having a shape corresponding to the shape of the metal mesh layer, which is desired to be fabricated, so as to form the metal mesh layer by the electroforming process, and the electroforming master may have a drum type as illustrated in FIG. 4, or otherwise may have a flat plate type, and thus, the electroforming master for the electroforming process in the present invention may have the drum type or the flat plate type.

That is, the electroforming master according to the present invention includes a base plate and a mesh formed on the base plate, and having a shape corresponding to the shape of the metal mesh layer desired to be fabricated, and when a shape of the base plate is a drum type, the electroforming master according to the present invention may be the drum type, and when a shape of the base plate is a flat plate type, the electroforming master according to the present invention may be the flat plate type.

Hereinafter, the forming of the metal mesh layer through the aforementioned mesh type negative electrode drum will be described.

Referring to FIG. 6, a continuous electroforming device for fabricating the metal mesh according to the present invention includes an electrolyzer 34 for accommodating an electrolyte for plating, the mesh type negative electrode drum 40 installed so that a part of the mesh type negative electrode drum 40 is submerged in the electrolyte of the electrolyzer 34, and rotated by applied power, and a positive electrode basket 31 installed so as to be completely submerged in the electrolyte of the electrolyzer 34, formed in a shape corresponding to a shape of the mesh type negative electrode drum 40, and maintaining a predetermined distance from the mesh type negative electrode drum 40.

In order to form the metal mesh layer according to the present invention, the electrolyte may be formed of at least one material among copper (Cu), silver (Ag), chrome (Cr), nickel (Ni), iron (Fe), cobalt (Co), and an alloy thereof, but the type of electrolyte is not limited in the present invention.

Subsequently, referring to FIG. 6, the electrolyzer 34 has a semi-cylindrical shape of which a center lower surface is perforated in a down direction, and the electrolyte for plating the surface of the mesh type negative electrode drum 40 may be accommodated in the electrolyzer 34.

An auxiliary tank 30 for accommodating the electrolyte over-flowing from the electrolyzer 34 is formed under the electrolyzer 34, so that a structure for accommodating the electrolyte may be a dual structure of the electrolyte 34 and the auxiliary tank 30.

Accordingly, a part, that is, about a half, of the rotating mesh type negative electrode drum 40 is submerged in the electrolyzer 34, so that the electrolyte of the electrolyzer 34 is stirred by an electrolyte injected from an electrolyte injection path 32, which is to be described below, and the electrolyte over flowing from the electrolyzer 34 is accommodated in the auxiliary tank 30 while the electrolyte is stirred by the injection of the electrolyte from the electrolyte injection path 32.

The mesh type negative electrode drum 40 rotating while about a half thereof is submerged in the electrolyte is installed in the electrolyzer 34.

The mesh type negative electrode drum 40 may include the rotation shaft 41b connected to a negative (−) electrode of an applied power source, and serving as a center so that the mesh type negative electrode drum 40 is rotatable, and the cylindrical drum 41a surrounding the rotation shaft 41b and having a predetermined width.

In the meantime, although not illustrated in the drawing, a power supply device for supplying a negative (−) electrode from a rectifier may be provided at one end of the rotation shaft 41b, and the motor for providing rotational force so as to rotate the cylindrical drum 41a may be coupled to the other end of the rotation shaft 41b.

Accordingly, when power is supplied to the motor so that rotational power is generated, the rotation power is transmitted to the rotation shaft 41b to rotate the cylindrical drum 41a.

In the meantime, as illustrated in FIG. 4, the mesh 42 having the shape corresponding to the plurality of holes 132a and 132b (see FIG. 2) provided in the metal mesh desired to be fabricated may be formed on the surface of the cylindrical drum 41a, and in the embodiment of the present invention, the mesh 42 may be formed in a net shape, in which a plurality of approximately hexagons is connected, to be shaped like a honeycomb.

This has been described with reference to FIG. 4, so that a detailed description of the mesh type negative electrode drum will be omitted hereinafter.

A positive electrode basket 31 formed of an insoluble positive electrode (+) or titanium (Ti) is installed under the mesh type negative electrode drum 40.

The positive electrode basket 31 is completely submerged in the electrolyte of the electrolyzer 34, and is formed in a circular arc shape, of which a half is cut, so as to correspond to the mesh type negative electrode drum 40 and is installed to maintain a predetermined distance from the mesh type negative electrode drum 40.

A metal cluster 33 having the same component as that of the electrolyte of the electrolyzer 34 may be accommodated inside the positive electrode basket 31.

The metal cluster 33 is surrounded by a separation preventing net for preventing the metal cluster 33 from being separated from the inside of the positive electrode basket 31 to the inside of the electrolyzer 34 to be stored.

The metal cluster 33 is dissolved in the electrolyte of the electrolyzer 34 as a metal lump having the same component as that of the electrolyte of the electrolyzer 34, so that the metal cluster 33 may serve to adjust a quantity and a concentration of the electrolyte plated on the surface of the cylindrical drum 41a.

Accordingly, when a current is applied to the positive electrode basket 31, positive (+) ions dissolved from the metal cluster 33 move to the surface of the cylindrical drum 41a and are electrodeposited, so that the surface of the cylindrical drum 41a is plated.

The electrolyte injection path 32 for injecting the electrolyte so that the electrolyte of the electrolyzer 34 is stirred may be formed at a lower end part of the electrolyzer 34, more particularly, a center of a lower end of the positive electrode basket 31, and an inner side of the electrolyte injection path 32 may communicate with an inner side of the electrolyzer 34, and the electrolyte injection path 32 may be formed of an elongated cylindrical plastic pipe.

Accordingly, when the electrolyte is injected and supplied into the electrolyzer 34 through the electrolyte injection path 32, the electrolyte inside the electrolyzer 34 is stirred, and hydrogen ($H_2$) gas generated in the mesh type negative electrode drum 40 may be smoothly removed.

Although it is not illustrated in the drawing, the continuous electroforming device may further include a circulation-filtering means, and the circulation-filtering means may serve to remove foreign materials in the electrolyte while circulating the electrolyte inside the auxiliary tank 30 to the electrolyzer 34, but the circulation-filtering means is a general configuration, so that a detailed description thereof will be omitted below.

Next, referring to FIG. 6, a guide roller 51 for peeling the metal mesh 50 plated on an outer circumferential surface of the cylindrical drum 41*a* may be provided on a right upper part of the mesh type negative electrode drum 40, and a cleaning bath 60 for cleaning a surface of the metal mesh 50 may be included.

A winding roller 70 may be provided at a right side of the cleaning bath 60, and the winding roller 70 may continuously wind the metal mesh 50 which is cleaned while passing through the cleaning bath 60.

Hereinafter, a method of fabricating the metal mesh by using the continuous electroforming device will be described below with reference to FIG. 7.

First, an electrolyte stirring operation (S10), in which when electricity is conducted in the electrolyte of the electrolyzer 34 by applied power, electrolysis is incurred, and the electrolyte is injected to the electrolyzer 34 by the electrolyte injection path 32 to stir the electrolyte, is performed. However, the electrolyte stirring operation is an optional matter in the present invention, so that the electrolyte stirring operation may be omitted in some cases.

After the electrolyte stirring operation (S10), a drum rotating operation (S20), in which the mesh type negative electrode drum 40 installed inside the electrolyzer 34 is rotated, is performed. In this case, the drum rotating operation is an operation corresponding to the case where the electroforming master is a drum type, and may be omitted when the electroforming master is a flat plate type.

Next, an electrodepositing operation (S30), in which a metal mesh layer is formed by electrodepositing at least one material among copper (Cu), silver (Ag), chrome (Cr), nickel (Ni), iron (Fe), cobalt (Co), and an alloy thereof, which are melted in the electrolyte, for example, copper (Cu), on an upper surface of a mesh, is performed.

A current density in the electrodepositing operation (S30) may be 0.1 to 30 mA/cm$^2$, but a range of the current density is not limited in the present invention, and the current density may be varied according to a material desired to be electrodeposited.

For example, the range of 0.1 to 1 mA/cm$^2$ in the range of the current density may be a range in which copper (Cu) is actively electrodeposited, and the range of 3 to 15 mA/cm$^2$ in the range of the current density may be a range in which nickel (Ni) is actively electrodeposited.

It is preferable that the electrodepositing operation is performed within a predetermined temperature range of the electrolyte, so that the electrodeposition of the metal mesh layer is more actively performed in the range of the current density.

For example, the electrodeposition of copper (Cu) or nickel (Ni) may be actively performed when a temperature of the electrolyte is 10 to 50° C., but a temperature of the electrolyte is not limited in the present invention.

According to the aforementioned condition, after the completion of the electrodepositing operation (S30), the metal mesh layer is formed on an external surface of the mesh type negative electrode drum 40, more particularly, an upper part of the mesh 42 (see FIG. 5).

After the electrodepositing operation (S30), an electrodeposited layer peeling operation (S40) of peeling the metal mesh layer from the external surface of the mesh type negative electrode drum 40, particularly, the mesh, continues.

The electrodeposited layer peeling operation (S40) is performed while the metal mesh layer attached to the external surface of the mesh type negative electrode drum 40 is guided to an upper and right side by a rotation of the guide roller 51.

More particularly, the metal mesh 50 may be formed by an electroforming process by applying an adhesive on a protection film (not illustrated), such as PET, PC, and PMMA, laminating the protection film on the metal mesh layer formed on the mesh on the surface of the mesh type negative electrode drum 40, and then peeling the protection film (not illustrated) and the metal mesh layer together.

After the electrodeposited layer peeling operation (S40), an electrodeposited layer washing operation (S50), in which the metal mesh 50 separated from the mesh type negative electrode drum 40 is submerged into the cleaning bath 60 and is washed, is performed, and a metal mesh winding operation (S60), in which the metal mesh 50 washed through the electrodeposited layer washing operation (S50) is wound while being transferred to the winding roller 70, is performed.

When all of the operations are completed, the metal mesh 50 may be stored in a state of being wound around the winding roller 70, and the metal mesh 50 may be cut in a demanded length and shape according to a necessity and applicable to various fields as a matter of course.

In the meantime, it is illustrated that in the electrodeposited layer peeling operation, the metal mesh 50 is formed by an electroforming process by applying the adhesive on the protection film (not illustrated), laminating the protection film on the metal mesh layer formed on the mesh on the surface of the mesh type negative electrode drum, and then peeling the protection film (not illustrated) and the metal mesh layer together, but by contrast without a separate protection film, only the metal mesh layer is separable from the mesh of the mesh type negative electrode drum, and in this case, the metal mesh layer is thin, so that it is difficult to treat the metal mesh layer according to a process, and thus the metal mesh 50, which is washed through the electrodeposited layer washing operation (S50), may be attached to a separate protection film to be used.

As described above, in the present invention, it is possible to form the metal mesh layer through the continuous electroforming device for fabricating the metal mesh, and the formed metal mesh layer may be used as the aforementioned metal mesh layer of the current collector.

FIGS. 8 to 11 are cross-sectional views illustrating a method of manufacturing the current collector for the rechargeable battery according to the present invention. Hereinafter, the method of manufacturing the current collector for the rechargeable battery according to the present invention will be described based on a method of manufacturing the current collector for the rechargeable battery according to the first embodiment of the present invention described with reference to FIG. 2.

Figure 8:
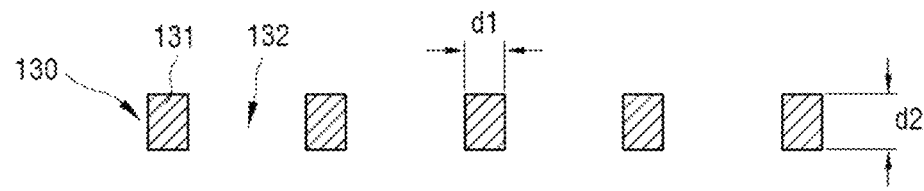
FIGS. 8 to 11 are cross-sectional views illustrating a method of manufacturing the current collector for the rechargeable battery according to the present invention.

First, referring to FIG. 8, the metal mesh layer 130 is manufactured by using the aforementioned metal mesh manufacturing device.

In the meantime, it has been described that the metal mesh layer is manufactured by an electroforming method using the continuous electroforming device, but, by contrast, the metal mesh layer may be manufactured by a weaving or mechanical processing method, and thus, the method of manufacturing the metal mesh layer is not limited in the present invention.

In this case, a width d1 of the metal mesh layer 130 may be 1 to 500 μm, and a thickness d2 of the metal mesh layer may be 1 to 500 μm, and further, an interval between the metal mesh patterns, that is, a size of the hole 132 positioned between the metal mesh patterns 131 may be 1 μm to 3 mm, but numerical values thereof are not limited in the present invention.

Figure 9:
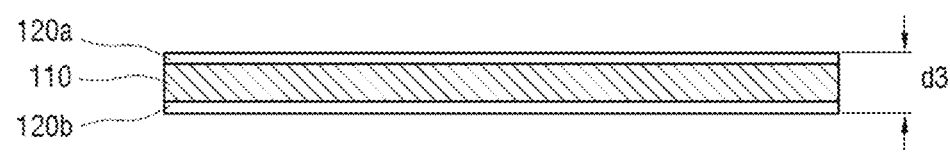

Next, referring to FIG. 9, the first adhesive layer 120a is formed on the first surface of the base material 110, and the second adhesive layer 120b is formed on the second surface of the base material 110.

The first adhesive layer 120a and the second adhesive layer 120b may be the solder layers, and the solder layer may be formed by a publicly known electroplating method or electroless plating method, but the method of forming the solder layer is not limited in the present invention.

In this case, a thickness of the base material 110 may be 1 to 100 μm, a thickness of the first adhesive layer or the second adhesive layer is 1 to 20 μm, and a thickness d3 of the base material, the first adhesive layer, and the second adhesive layer may be 2 to 120 μm, but numerical values thereof are not limited in the present invention.

Figure 10:
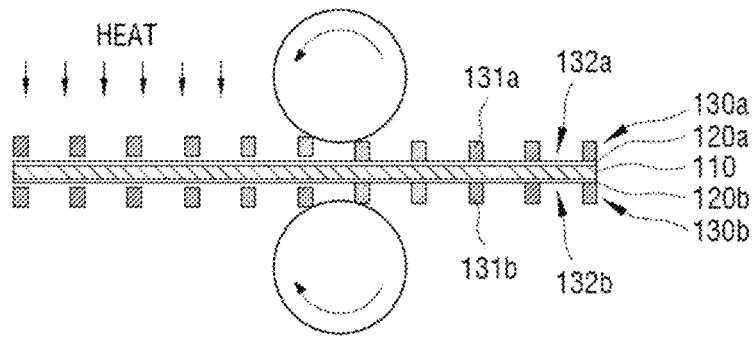

Next, referring to FIG. 10, the first metal mesh layer 130a is positioned on the first adhesive layer 120a, the second metal mesh layer 130b is positioned on the second adhesive layer 120b, and then the first metal mesh layer and the second metal mesh layer are compressed on the first adhesive layer and the second adhesive layer by using a compression roller, respectively.

In this case, the first metal mesh layer and the second metal mesh layer may be compressed at a predetermined temperature in order to improve performance of adhesion of the adhesive layers and the metal mesh layers, and the predetermined temperature may be 150 to 500° C.

Accordingly, it is possible to manufacture the current collector for the rechargeable battery including the metal mesh layer according to the present invention.

Figure 11:
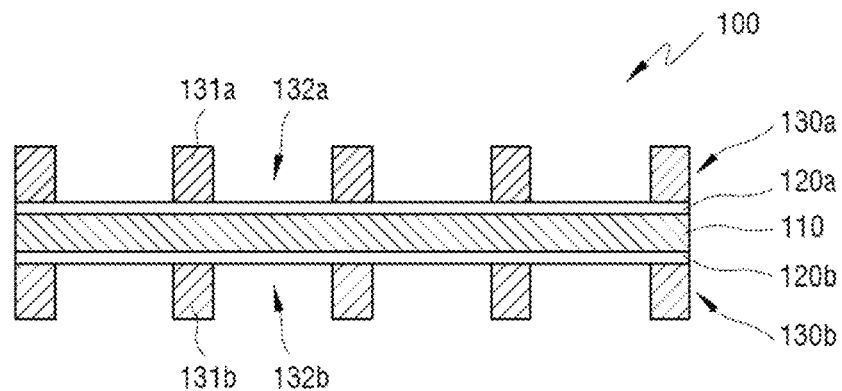

That is, as illustrated in FIG. 11, the current collector 100 for the rechargeable battery according to the first embodiment of the present invention includes the metal mesh layers 130a and 130b formed on the first surface and the second surface of the base material 110, respectively, and each of the metal mesh layers includes the plurality of metal mesh patterns 131a and 131b, and the holes 132a and 132b positioned between the metal mesh patterns, respectively, and in this case, the current collector 100 includes adhesive layers 120a and 120b for attaching the base material and the metal mesh layers.

Hereinafter, a method of manufacturing the current collector for the rechargeable battery according to the present invention will be described in more detail.

Figure 12:
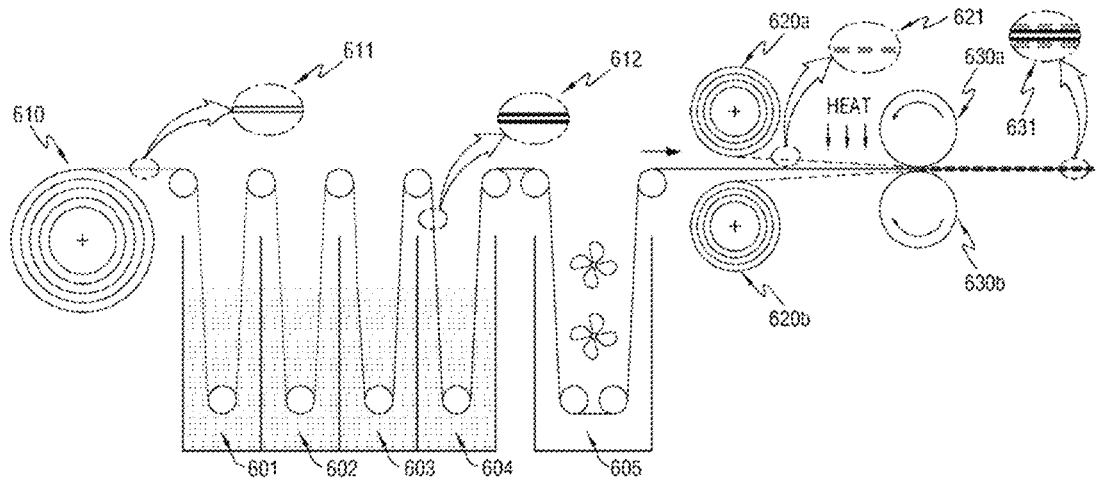
FIG. 12 is a configuration diagram schematically illustrating manufacturing of the current collector for the rechargeable battery according to the first embodiment of the present invention.
Figure 13:
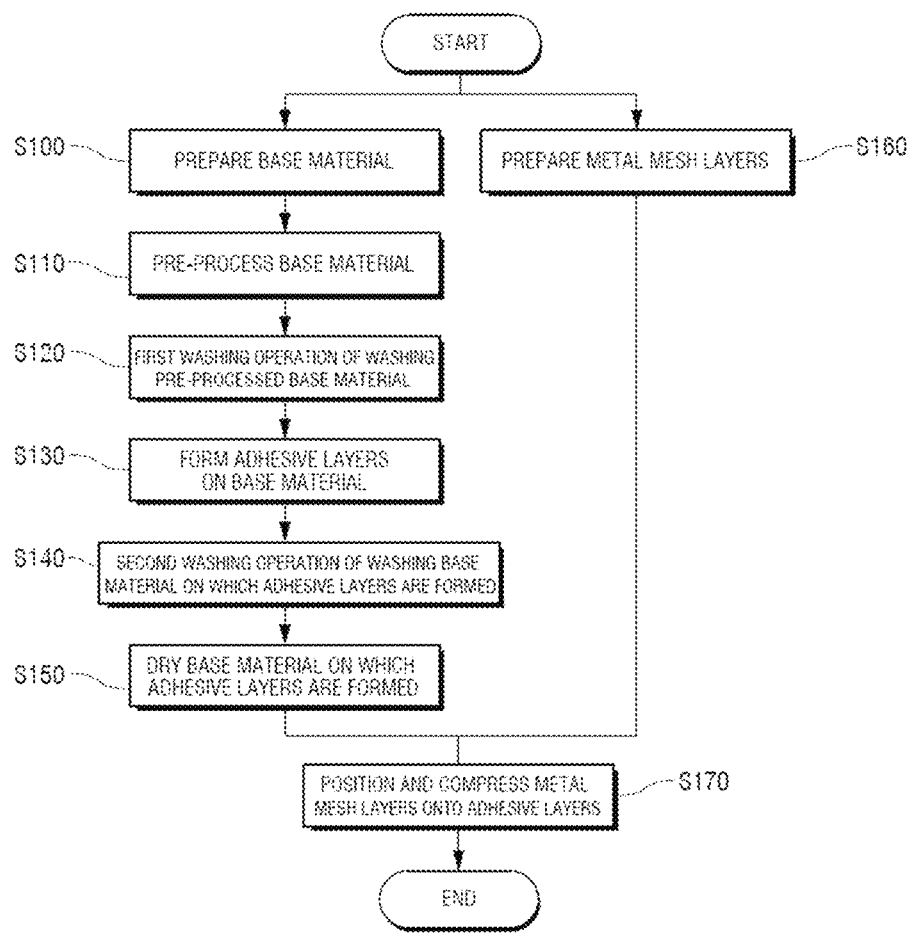
FIG. 13 is a process flowchart illustrating a method of manufacturing the current collector for the rechargeable battery according to the first embodiment of the present invention.
Figure 14:
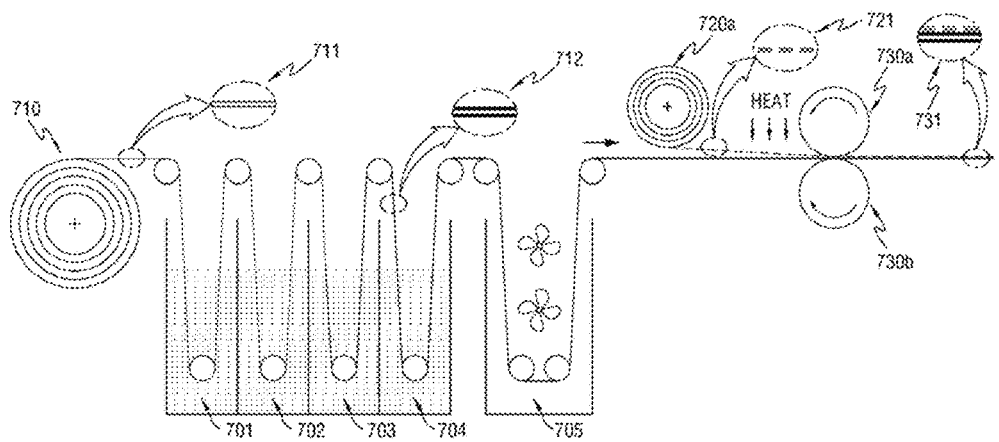
FIG. 14 is a configuration diagram schematically illustrating manufacturing of the current collector for the rechargeable battery according to the second embodiment of the present invention.

FIG. 12 is a configuration diagram schematically illustrating manufacturing of the current collector for the rechargeable battery according to the first embodiment of the present invention, FIG. 13 is a process flowchart illustrating a method of manufacturing the current collector for the rechargeable battery according to the first embodiment of the present invention, and FIG. 14 is a configuration diagram schematically illustrating manufacturing of the current collector for the rechargeable battery according to the second embodiment of the present invention. However, the method of manufacturing the current collector for the rechargeable battery according to the second embodiment of the present invention may be the same as the method of manufacturing the current collector for the rechargeable battery according to the first embodiment of the present invention except for the matter to be described below, and a particular process flowchart will be referred to FIG. 13.

First, referring to FIGS. 12 and 13, in the method of manufacturing the current collector for the rechargeable battery according to the first embodiment of the present invention, a base material 611 prepared by a base material supply unit 610 is provided (S100).

The base material 611 may be varied according to whether the current collector is a positive electrode current collector or a negative electrode current collector, which has been described above, so that a detailed description thereof will be omitted.

Next, the base material is pre-preprocessed (S110).

The pre-processing may be a general chemical pre-processing method, and the chemical pre-processing method may be a method, such as acid washing and fat removal, of removing oil, contaminants, and impurities on a surface of the metal material by submerging a target material, that is, the base material in an acidic or alkaline solution or spraying the solution to the target material.

In the present invention, the pre-processing may be a chemical pre-processing method by a method of submerging the base material in a water tank 601 for pre-processing in which the pre-processing solution is accommodated, but the pre-processing method is not limited in the present invention, and the pre-processing process may be omitted as necessary.

Next, a first washing operation of washing the pre-processed base material is performed (S120).

The first washing operation, which is a process for removing the pre-processing solution and the like used in the pre-processing process, may be performed by a method of submerging the base material in a water tank 602 for first washing in which a washing fluid is accommodated, but the washing method is not limited in the present invention, and the first washing process may be omitted as necessary.

Next, adhesive layers are formed on the base material (S130).

The adhesive layer may be a solder layer, and the solder layer may be formed by a publicly known electroplating method or electroless plating method using the method of submerging the base material in a water tank 603 for plating including a plating liquid, but the method of forming the solder layer is not limited in the present invention.

In this case, the solder layers may be formed on the first surface and the second surface of the base material, respectively.

Next, a second washing operation of washing the base material 612, on which the adhesive layers are formed, is performed (S140).

The second washing operation, which is a process for washing the plating liquid and the like used in the adhesive layer forming process, may be performed by a method of submerging the base material in a water tank 604 for the second washing in which a washing fluid is accommodated, but the washing method is not limited in the present invention, and the second washing process may be omitted as necessary.

Next, an operation of drying the base material, on which the adhesive layers are formed, is performed (S150).

The drying operation may be hot-air drying performed by a hot-air drying furnace 605, but the drying method is not limited in the present invention, and the drying process may be omitted as necessary.

Subsequently, referring to FIGS. 12 and 13, a metal mesh layer 621 is manufactured and provided by using the aforementioned metal mesh manufacturing device (S160).

In this case, as described above, the metal mesh layer may include the metal mesh patterns and the holes between the metal mesh patterns, and this has been described above, so that a detailed description thereof will be omitted.

In the meantime, as illustrated in FIG. 12, in the current collector for the rechargeable battery according to the first embodiment of the present invention, metal mesh layer supply units 620a and 620b may be positioned on the first surface and the second surface of the base material, respectively, in order to supply the metal mesh layer to the first surface and the second surface of the base material.

Next, the metal mesh layer is positioned on the adhesive layer of the base material including the adhesive layer, and the metal mesh layer are compressed by compression rollers 630a and 630b.

In this case, in the current collector for the rechargeable battery according to the first embodiment of the present invention, the first metal mesh layer provided from the first metal mesh layer supply unit 620a may be positioned on the first adhesive layer positioned on the first surface of the base material, the second metal mesh layer provided from the second metal mesh layer supply unit 620b may be positioned on the second adhesive layer positioned on the second surface of the base material, and then the first metal mesh layer and the second metal mesh layer may be compressed on the first adhesive layer and the second adhesive layer through the compression rollers, respectively.

In this case, the first metal mesh layer and the second metal mesh layer may be compressed at a predetermined temperature in order to improve performance of adhesion of the adhesive layers and the metal mesh layers, and the predetermined temperature may be 150 to 500° C.

Accordingly, it is possible to manufacture the current collector for the rechargeable battery including the metal mesh layer according to the first embodiment of the present invention.

That is, as illustrated in FIG. 11, the current collector 631 for the rechargeable battery according to the first embodiment of the present invention includes the metal mesh layers formed on the first surface and the second surface of the base material, respectively, and each of the metal mesh layers includes the plurality of metal mesh patterns and the holes positioned between the metal mesh patterns, and in this case, the current collector 631 includes the adhesive layers for attaching the base material and the metal mesh layers.

Next, referring to FIG. 14, in a method of manufacturing the current collector for the rechargeable battery according to the second embodiment of the present invention, a base material 710 prepared by a base material supply unit 710 is provided.

Next, the base material is pre-preprocessed.

The pre-processing may be a chemical pre-processing method using a method of submerging the base material in a water tank 701 for pre-processing in which a pre-processing solution is accommodated.

Next, a first washing operation of washing the pre-processed base material is performed.

The first washing operation may be performed by a method of submerging the base material in a water tank 702 for first washing in which a washing fluid is accommodated.

Next, adhesive layers are formed on the base material.

The adhesive layer may be a solder layer, and the solder layer may be formed by a publicly known electroplating method or electroless plating method using a method of submerging the base material in a water tank 703 for plating including a plating liquid.

In this case, the solder layer may be formed on any one surface between the first surface and the second surface of the base material, for example, the first surface, and in this case, a separate protection film is attached onto the second surface of the base material, so that the solder layer is not formed on the second surface of the base material.

Next, a second washing operation of washing the base material 712, on which the adhesive layers are formed, is performed.

The second washing operation, which is a process for washing the plating liquid and the like used in the adhesive layer forming process, may be performed by a method of submerging the base material in a water tank 704 for second washing in which a washing fluid is accommodated.

Next, an operation of drying the base material, on which the adhesive layers are formed, is performed.

The drying operation may be hot-air drying performed by a hot-air drying furnace 705.

Next, referring to FIG. 14, a metal mesh layer 721 is manufactured and provided by using the aforementioned metal mesh manufacturing device.

In this case, as described above, the metal mesh layer may include the metal mesh patterns and the holes between the metal mesh patterns, and this has been described above, so that a detailed description thereof will be omitted below.

In the meantime, as illustrated in FIG. 14, in the current collector for the rechargeable battery according to the second embodiment of the present invention, a metal mesh layer supply unit 720a may be positioned only on the first surface of the base material in order to supply the metal mesh layer to any one surface of the first surface and the second surface of the base material, for example, the first surface.

As described above, in the rechargeable battery, for example, in a positive electrode, a positive electrode active material may be applied onto one surface or both surfaces of a positive electrode current collector.

That is, the method of manufacturing the current collector for the rechargeable battery according to the second embodiment of the present invention is an embodiment in which the metal mesh layer is formed on only one surface of the base material, so that the metal mesh layer may be formed on the first surface and/or the second surface of the base material in the present invention.

Next, the metal mesh layer is positioned on the adhesive layer of the base material including the adhesive layer, and the metal mesh layers are compressed by compression rollers 730a and 730b.

In this case, in the current collector for the rechargeable battery according to the second embodiment of the present invention, the first metal mesh layer provided from the first metal mesh layer supply unit 720a may be positioned on the first adhesive layer positioned on the first surface of the base material, and the first metal mesh layer may be compressed onto the first adhesive layer through the compression rollers.

In this case, the first metal mesh layer may be compressed at a predetermined temperature in order to improve performance of adhesion of the adhesive layer and the metal mesh layer, and the predetermined temperature may be 150 to 500° C.

Accordingly, it is possible to manufacture the current collector for the rechargeable battery including the metal mesh layer according to the second embodiment of the present invention.

That is, as illustrated in FIG. 3, the current collector 731 for the rechargeable battery according to the second embodiment of the present invention includes the metal mesh layer formed on the first surface of the base material, and the metal mesh layer includes the plurality of metal mesh patterns and the holes positioned between the metal mesh patterns, and in this case, the current collector 731 includes the adhesive layer for attaching the base material and the metal mesh layer.

Figure 15:
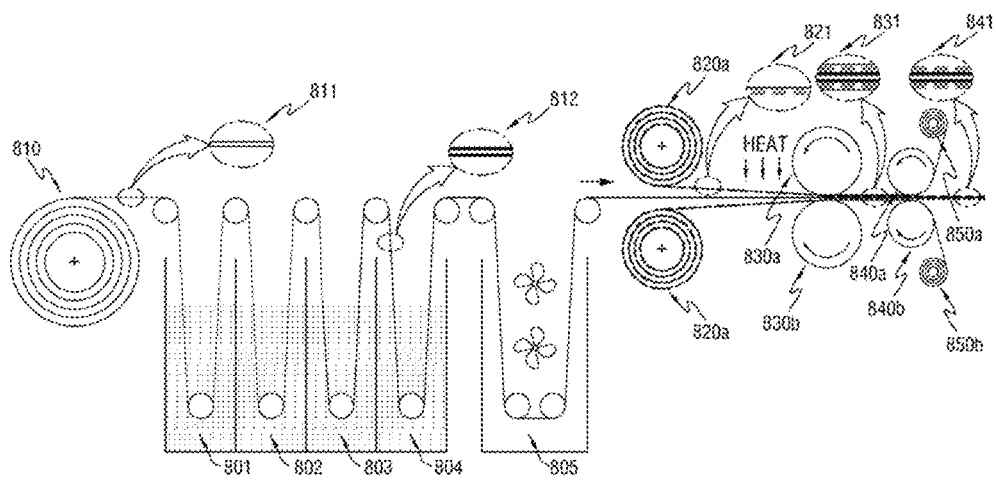
FIG. 15 is a configuration diagram schematically illustrating manufacturing of a current collector for a rechargeable battery according to a modified example of the first embodiment of the present invention.
Figure 16:
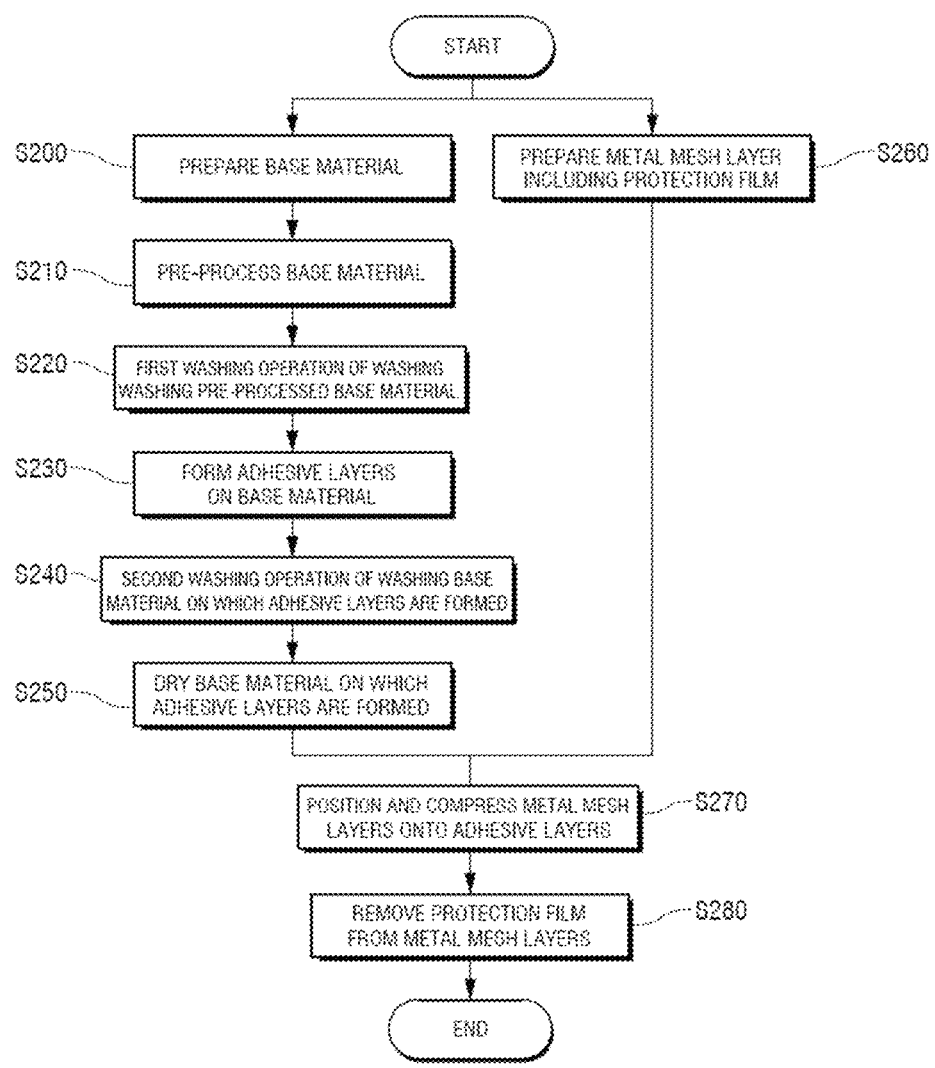
FIG. 16 is a process flowchart illustrating a method of manufacturing the current collector for the rechargeable battery according to the modified example of the first embodiment of the present invention.
Figure 17:
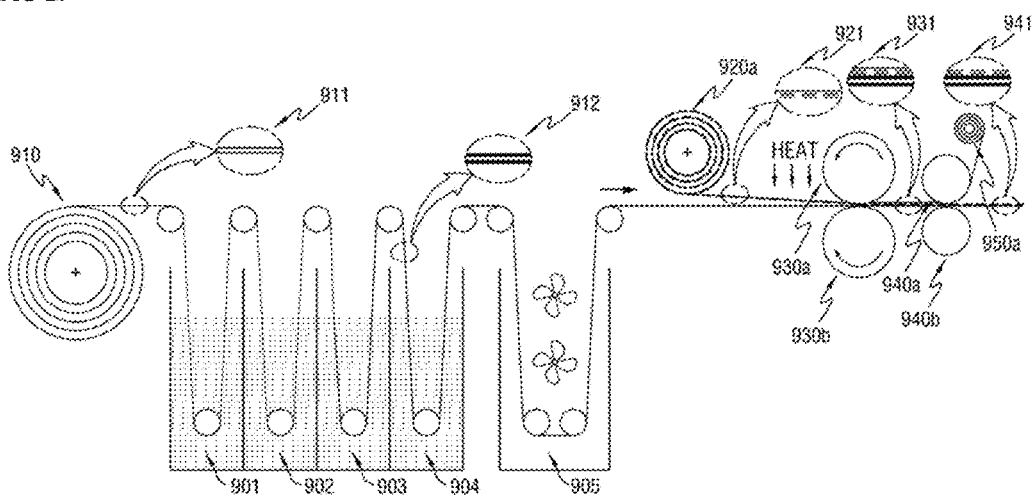
FIG. 17 is a configuration diagram schematically illustrating manufacturing of the current collector for the rechargeable battery according to the modified example of the second embodiment of the present invention.

FIG. 15 is a configuration diagram schematically illustrating manufacturing of a current collector for a rechargeable battery according to a modified example of the first embodiment of the present invention, FIG. 16 is a process flowchart illustrating a method of manufacturing the current collector for the rechargeable battery according to the modified example of the first embodiment of the present invention, and FIG. 17 is a configuration diagram schematically illustrating manufacturing of the current collector for the rechargeable battery according to the modified example of the second embodiment of the present invention. However, a method of manufacturing of a current collector for a rechargeable battery according to a modified example of the first embodiment of the present invention may be the same as the method of manufacturing the current collector for the rechargeable battery according to the first embodiment of the present invention. However, a method of manufacturing of a current collector for a rechargeable battery according to a modified example of the second embodiment of the present invention may be the same as the method of manufacturing the current collector for the rechargeable battery according to the modified example of the first embodiment of the present invention except for the matter to be described below, and a particular process flowchart will be referred to FIG. 16.

First, referring to FIGS. 15 and 16, in the method of manufacturing the current collector for the rechargeable battery according to the modified example of the first embodiment of the present invention, a base material 811 prepared by a base material supply unit 810 is provided (S200).

Next, the base material is pre-preprocessed (S210).

The pre-processing may be a chemical pre-processing method using a method of submerging the base material in a water tank 801 for pre-processing in which a pre-processing solution is accommodated.

Next, a first washing operation of washing the pre-processed base material is performed (S220).

The first washing operation may be performed by a method of submerging the base material in a water tank 802 for first washing in which a washing fluid is accommodated.

Next, adhesive layers are formed on the base material (S230).

The adhesive layer may be a solder layer, and the solder layer may be formed by a publicly known electroplating method or electroless plating method using a method of submerging the base material in a water tank 803 for plating including a plating liquid.

In this case, the solder layers may be formed on the first surface and the second surface of the base material, respectively.

Next, a second washing operation of washing the base material 812, on which the adhesive layers are formed, is performed (S240).

The second washing operation may be performed by a method of submerging the base material in a water tank 804 for second washing in which a washing fluid is accommodated.

Next, an operation of drying the base material, on which the adhesive layers are formed, is performed (S250).

The drying operation may be hot-air drying performed by a hot-air drying furnace 805.

Subsequently, referring to FIGS. 15 and 16, a metal mesh layer 821 including a protection film is manufactured and provided by using the aforementioned metal mesh manufacturing device (S260).

As described above, in the pre-deposited layer peeling operation of manufacturing the metal mesh layer, an adhesive may be applied onto the protection film, the protection film may be laminated on the metal mesh layer formed on the mesh of the surface of the mesh type negative electrode drum, and then the protection film and the metal mesh layer may be peeled together.

By contrast, only the metal mesh layer may be separated from the mesh of the mesh type negative electrode drum without a separate protection film, and in this case, the metal mesh, which is washed through the pre-deposited layer washing operation, may be attached to a separate protection film and used for easiness in the process.

The method of manufacturing the current collector for the rechargeable battery according to the modified example of the first embodiment of the present invention corresponds to the case where the metal mesh layer including the protection film is used.

Subsequently, referring to FIGS. 15 and 16, as described above, the metal mesh layer may include the metal mesh patterns and the holes between the metal mesh patterns, and this has been described above, so that a detailed description thereof will be omitted.

In the meantime, as illustrated in FIG. 15, in the current collector for the rechargeable battery according to the modified example of the first embodiment of the present invention, metal mesh layer supply units 820a and 820b may be positioned on the first surface and the second surface of the base material, respectively, in order to supply the metal mesh layer to the first surface and the second surface of the base material.

Next, the metal mesh layer is positioned on the adhesive layer of the base material including the adhesive layer, and the metal mesh layers are compressed by compression rollers 830a and 830b (S270).

When the metal mesh layer is positioned on the adhesive layer, an opposing surface to the surface of the metal mesh layer, on which the protection film is positioned, is positioned on the adhesive layer.

In this case, in the current collector for the rechargeable battery according to the modified example of the first embodiment of the present invention, a first metal mesh layer provided from the first metal mesh layer supply unit 820a may be positioned on a first adhesive layer positioned on a first surface of the base material, a second metal mesh layer provided from the second metal mesh layer supply unit 820b may be positioned on a second adhesive layer positioned on a second surface of the base material, and then the first metal mesh layer and the second metal mesh layer may be compressed on the first adhesive layer and the second adhesive layer through the compression rollers, respectively.

In this case, the first metal mesh layer and the second metal mesh layer may be compressed at a predetermined temperature in order to improve performance of adhesion of the adhesive layers and the metal mesh layers, and the predetermined temperature may be 150 to 500° C.

In the meantime, in the current collector 831 for the rechargeable battery, on which up to operation S270 is performed, the metal mesh layer includes the protection film, so that an opposing surface of the metal mesh layer, which is not attached to the adhesive layer, includes the protection film.

Accordingly, in the method of manufacturing the current collector for the rechargeable battery according to the modified example of the first embodiment of the present invention, the protection film is removed from the metal mesh layer during final use (S280).

In the meantime, compared to the first embodiment, in the modified example of the first embodiment, the protection film is included on the metal mesh layer, more particularly, on the opposing surface of the metal mesh layer, which is not attached to the adhesive layer, so that it is possible to easily achieve a protection property and a storage property of the current collector for the rechargeable battery.

Accordingly, it is possible to manufacture the current collector for the rechargeable battery including the metal mesh layer according to the modified example of the first embodiment of the present invention.

Next, referring to FIG. 17, in a method of manufacturing the current collector for the rechargeable battery according to the modified example of the second embodiment of the present invention, a base material 911 prepared by a base material supply unit 910 is provided.

Next, the base material is pre-preprocessed.

The pre-processing may be a chemical pre-processing method using a method of submerging the base material in a water tank 901 for pre-processing in which a pre-processing solution is accommodated.

Next, a first washing operation of washing the pre-processed base material is performed.

The first washing operation may be performed by a method of submerging the base material in a water tank 902 for first washing in which a washing fluid is accommodated.

Next, adhesive layers are formed on the base material.

The adhesive layer may be a solder layer, and the solder layer may be formed by a publicly known electroplating method or electroless plating method using a method of submerging the base material in a water tank 903 for plating including a plating liquid.

In this case, the solder layer may be formed on any one surface between the first surface and the second surface of the base material, for example, the first surface, and in this case, a separate protection film is attached onto the second surface of the base material, so that the solder layer may not be formed on the second surface of the base material.

Next, a second washing operation of washing the base material, on which the adhesive layers are formed, is performed.

The second washing operation, which is a process for washing the plating liquid and the like used in the adhesive layer forming process, may be performed by a method of submerging the base material in a water tank 904 for second washing in which a washing fluid is accommodated.

Next, an operation of drying the base material, on which the adhesive layers are formed, is performed.

The drying operation may be hot-air drying performed by a hot-air drying furnace 905.

Subsequently, referring to FIG. 17, a metal mesh layer 921 including a protection film is manufactured and provided by using the aforementioned metal mesh manufacturing device.

In this case, as described above, the metal mesh layer may include the metal mesh patterns and the holes between the metal mesh patterns, and this has been described above, so that a detailed description thereof will be omitted.

In the meantime, as illustrated in FIG. 17, in the current collector for the rechargeable battery according to the modified example of the second embodiment of the present invention, a metal mesh layer supply unit 920a may be positioned only on the first surface of the base material in order to supply the metal mesh layer to any one surface of the first surface and the second surface of the base material, for example, the first surface.

As described above, in the rechargeable battery, for example, in a positive electrode, a positive electrode active material may be applied onto one surface or both surfaces of a positive electrode current collector.

That is, the method of manufacturing the current collector for the rechargeable battery according to the modified example of the second embodiment of the present invention is an embodiment in which the metal mesh layer is formed on only one surface of the base material, so that the metal mesh layer may be formed on the first surface and/or the second surface of the base material in the present invention.

Next, the metal mesh layer is positioned on the adhesive layer of the base material including the adhesive layer, and the metal mesh layers are compressed by compression rollers 930a and 930b.

In this case, in the current collector for the rechargeable battery according to the modified example of the second embodiment of the present invention, the first metal mesh layer provided from the first metal mesh layer supply unit 920a may be positioned on the first adhesive layer positioned on the first surface of the base material, and the first metal mesh layer may be compressed onto the first adhesive layer through the compression rollers.

In this case, the first metal mesh layer may be compressed at a predetermined temperature in order to improve performance of adhesion of the adhesive layer and the metal mesh layer, and the predetermined temperature may be 150 to 500° C.

In the meantime, as described above, in the current collector 931 for the rechargeable battery, on which up to the above operation is performed, the metal mesh layer includes the protection film, so that an opposing surface of the metal mesh layer, which is not attached to the adhesive layer, includes the protection film.

Accordingly, in the method of manufacturing the current collector for the rechargeable battery according to the modified example of the second embodiment of the present invention, the protection film is removed from the metal mesh layer during final use.

In the meantime, compared to the second embodiment, in the modified example of the second embodiment, the protection film is included on the metal mesh layer, more particularly, on the opposing surface of the metal mesh layer, which is not attached to the adhesive layer, so that it is possible to easily achieve a protection property and a storage property of the current collector for the rechargeable battery.

Accordingly, it is possible to manufacture the current collector for the rechargeable battery including the metal mesh layer according to the modified example of the second embodiment of the present invention.

Figure 18:
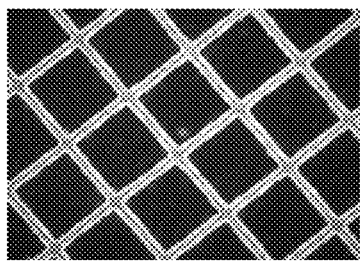
FIG. 18 is an actual picture illustrating an example of the metal mesh layer according to the present invention.
Figure 19:
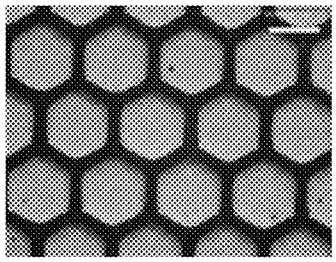
FIG. 19 is an actual picture illustrating another example of the metal mesh layer according to the present invention.

FIG. 18 is an actual picture illustrating an example of the metal mesh layer according to the present invention, and FIG. 19 is an actual picture illustrating another example of the metal mesh layer according to the present invention.

A plane shape of the metal mesh layer according to the present invention may be an approximate quadrangle as illustrated in FIG. 18, and a plane shape of the metal mesh layer according to the present invention may be an approximate hexagon as illustrated in FIG. 19.

As described above, when the metal mesh layer according to the present invention is manufactured by using the continuous electroforming device for manufacturing the metal mesh, the continuous electroforming device includes the cylindrical drum, and the shape of the metal mesh layer may be determined according to the shape of the mesh formed on the surface of the cylindrical drum.

That is, the mesh having the shape desired to be fabricated is formed on the surface of the cylindrical drum of the continuous electroforming device, and in this case, the mesh may be formed in a net shape, in which a plurality of approximate hexagons is connected, and shaped like a honeycomb, and further, the mesh may be formed in a shape, such as a quadrangle, a triangle, a pentagon, and when the shape of the mesh is a hexagon, the plane shape of the metal mesh layer may also be a hexagon, and when the shape of the mesh is a quadrangle, the plane shape of the metal mesh layer may also be a quadrangle. However, in the present invention, the shape of the metal mesh layer is not limited.

Figure 20:
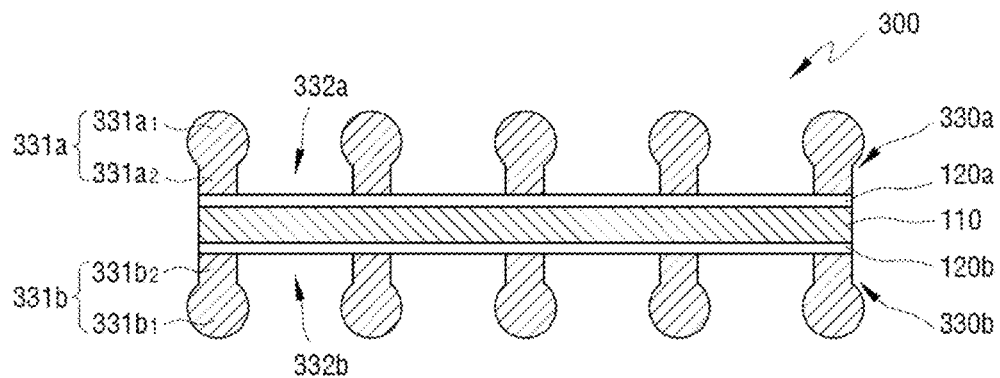
FIG. 20 is a cross-sectional view illustrating a current collector for a rechargeable battery according to a third embodiment of the present invention.
Figure 21:
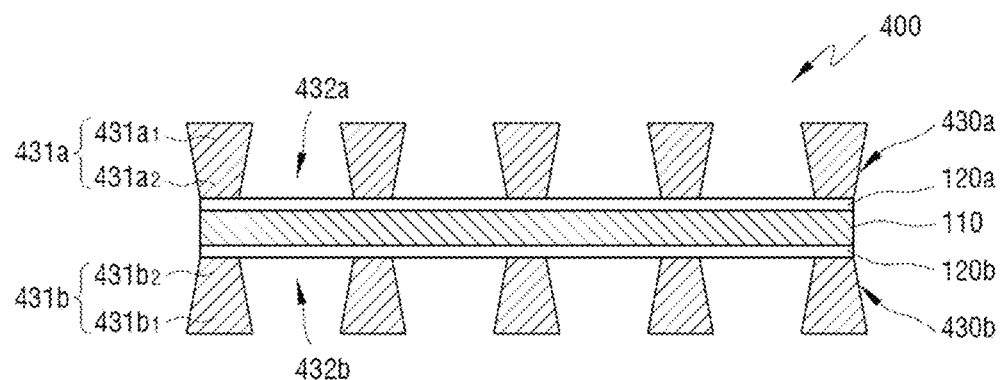
FIG. 21 is a cross-sectional view illustrating a current collector for a rechargeable battery according to a fourth embodiment of the present invention.
Figure 22:
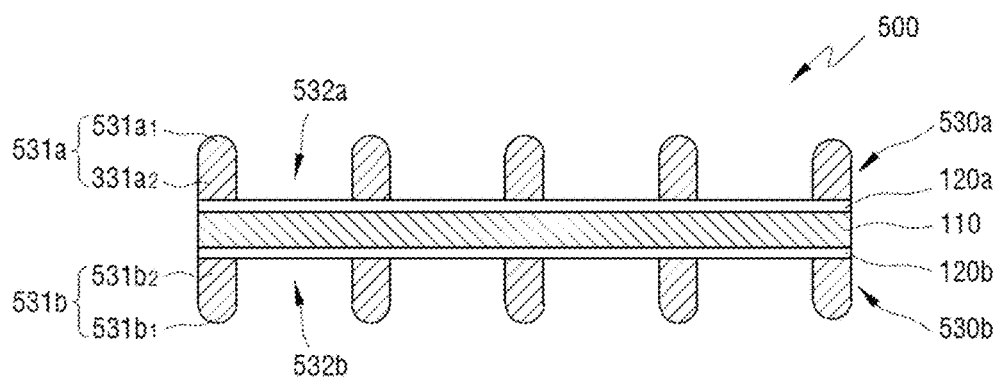
FIG. 22 is a cross-sectional view illustrating a current collector for a rechargeable battery according to a fifth embodiment of the present invention.

FIG. 20 is a cross-sectional view illustrating a current collector for a rechargeable battery according to a third embodiment of the present invention, FIG. 21 is a cross-sectional view illustrating a current collector for a rechargeable battery according to a fourth embodiment of the present invention, and FIG. 22 is a cross-sectional view illustrating a current collector for a rechargeable battery according to a fifth embodiment of the present invention.

In this case, current collectors for a rechargeable battery according to third to fifth embodiments may be the same as the current collector for the rechargeable battery according to the first embodiment except for the matter to be described below.

First, referring to FIG. 20, a current collector 300 for a rechargeable battery according to a third embodiment of the present invention includes metal mesh layers 330a and 330b formed on a first surface and a second surface of a base material 110, respectively, and each of the metal mesh layers includes a plurality of metal mesh patterns 331a and 331b, and holes 332a and 332b positioned between the metal mesh patterns, and in this case, the current collector 300 includes adhesive layers 120a and 120b for attaching the base material and the metal mesh layers.

In this case, a shape of the metal mesh pattern in the current collector 300 for the rechargeable battery according to the third embodiment of the present invention may be different from that of the current collector for the rechargeable battery according to the first embodiment of the present invention.

More particularly, the first metal mesh pattern 331a of the first metal mesh layer 330a includes a lower end $331a_2$ and an upper end $331a_1$, and the second metal mesh pattern 331b of the second metal mesh layer 330b includes a lower end $331b_2$ and an upper end $331b_1$, and in this case, widths of the upper ends $331a_1$ and $331b_1$ are greater than widths of the lower ends $331a_2$ and $331b_2$.

That is, the widths of the upper ends $331a_1$ and $331b_1$ are formed to be greater than the widths of the lower ends $331a_2$ and $331b_2$, so that the present invention may more efficiently prevent an active material applied onto the metal mesh layers through the holes 332a and 332b from being deintercalated.

In the meantime, a reference of the upper end and the lower end in the present invention is a surface of the base material to which each of the metal mesh layers is bonded, that is, the first metal mesh pattern may be divided into the upper end and the lower end based on the first surface of the base material, and the second metal mesh pattern may be divided into the upper end and the lower end based on the second surface of the base material.

Next, referring to FIG. 21, a current collector 400 for a rechargeable battery according to a fourth embodiment of the present invention includes metal mesh layers 430a and 430b formed on a first surface and a second surface of a base material 110, respectively, and each of the metal mesh layers includes a plurality of metal mesh patterns 431a and 431b, and holes 432a and 432b positioned between the metal mesh patterns, and in this case, the current collector 400 includes adhesive layers 120a and 120b for attaching the base material and the metal mesh layers.

In this case, a shape of the metal mesh pattern in the current collector 400 for the rechargeable battery according to the fourth embodiment of the present invention may be different from that of the current collector for the rechargeable battery according to the first embodiment of the present invention.

More particularly, the first metal mesh pattern 431a of the first metal mesh layer 430a includes a lower end $431a_2$ and an upper end $431a_1$, and the second metal mesh pattern 431b of the second metal mesh layer 430b includes a lower end $431b_2$ and an upper end $431b_1$, and in this case, widths of the upper ends $431a_1$ and $431b_1$ are greater than widths of the lower ends $431a_2$ and $431b_2$.

That is, the widths of the upper ends $431a_1$ and $431b_1$ are formed to be greater than the widths of the lower ends $431a_2$ and $431b_2$, so that the present invention may more efficiently prevent an active material applied onto the metal mesh layers through the holes 431a and 432b from being deintercalated.

In this case, as illustrated in FIG. 21, in the current collector for a rechargeable battery according to the fourth embodiment of the present invention, the metal mesh pattern has a shape of which the width is increased from the lower end to the upper end, and thus, it is possible to maximally secure a space on which the active material is applicable while more efficiently preventing the active material applied onto the metal mesh layers from being deintercalated, thereby increasing a capacity of the rechargeable battery.

In the meantime, a reference of the upper end and the lower end in the present invention is a surface of the base material to which each of the metal mesh layers is bonded, that is, the first metal mesh pattern may be divided into the upper end and the lower end based on the first surface of the base material, and the second metal mesh pattern may be divided into the upper end and the lower end based on the second surface of the base material.

Next, referring to FIG. 22, a current collector 500 for a rechargeable battery according to a fifth embodiment of the present invention includes metal mesh layers 530a and 530b formed on a first surface and a second surface of a base material 110, respectively, and each of the metal mesh layers includes a plurality of metal mesh patterns 531a and 531b, and holes 532a and 532b positioned between the metal mesh patterns, and in this case, the current collector 500 includes adhesive layers 120a and 120b for attaching the base material and the metal mesh layers.

In this case, a shape of the metal mesh pattern in the current collector 500 for the rechargeable battery according to the fifth embodiment of the present invention may be different from that of the current collector for the rechargeable battery according to the first embodiment of the present invention.

More particularly, the first metal mesh pattern 531a of the first metal mesh layer 530a includes a lower end $531a_2$ and an upper end $531a_1$, and the second metal mesh pattern 531b of the second metal mesh layer 530b includes a lower end $531b_2$ and an upper end $531b_1$, and in this case, widths of the upper ends 531a1 and 531b1 are smaller than widths of the lower ends $531a_2$ and $531b_2$.

That is, the widths of the upper ends $531a_1$ and $531b_1$ are formed to be smaller than the widths of the lower ends $531a_2$ and 531$b_2$, so that the present invention may more efficiently apply an active material onto the metal mesh layers through the holes 531$a$ and 531$b$.

In this case, it is illustrated in FIG. 22 that a cross-section of the upper ends 531$a_1$ and 531$b_1$ has a semi-circular shape, but a shape of the cross-section of the upper end is not limited within a range in which the width of the upper end is formed to be smaller than that of the lower end.

In the meantime, a reference of the upper end and the lower end in the present invention is a surface of the base material to which each of the metal mesh layers is bonded, that is, the first metal mesh pattern may be divided into the upper end and the lower end based on the first surface of the base material, and the second metal mesh pattern may be divided into the upper end and the lower end based on the second surface of the base material.

Figure 23:
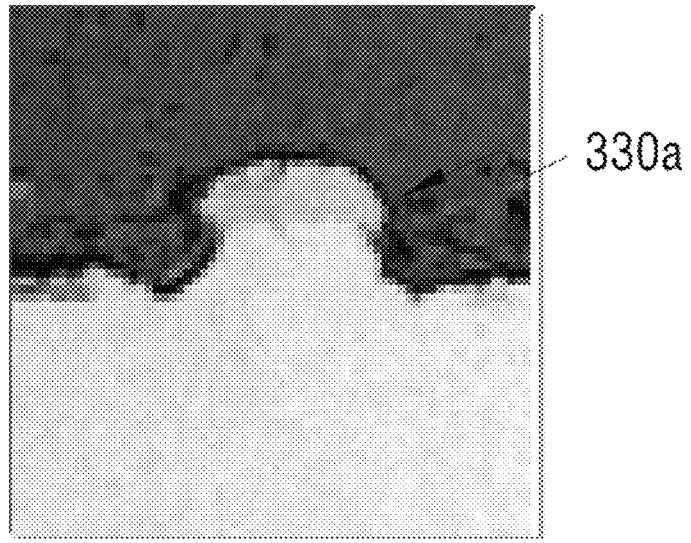
FIG. 23 is a picture illustrating a cross-section of a metal mesh pattern of the current collector for the rechargeable battery according to the third embodiment of the present invention.
Figure 24:
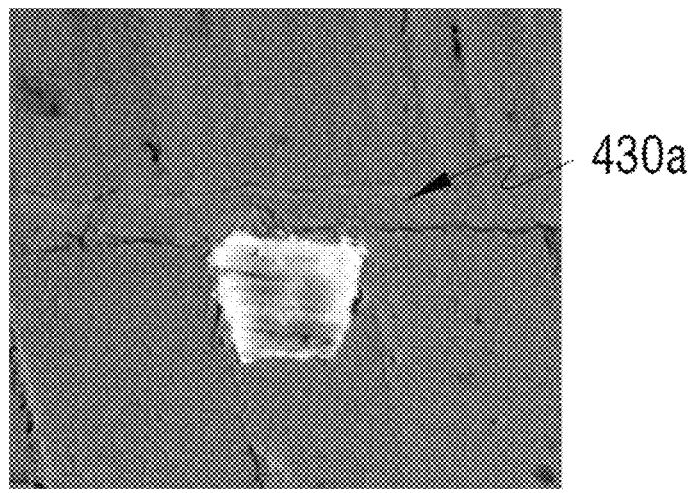
FIG. 24 is a picture illustrating a cross-section of a metal mesh pattern of the current collector for the rechargeable battery according to the fourth embodiment of the present invention.
Figure 25:
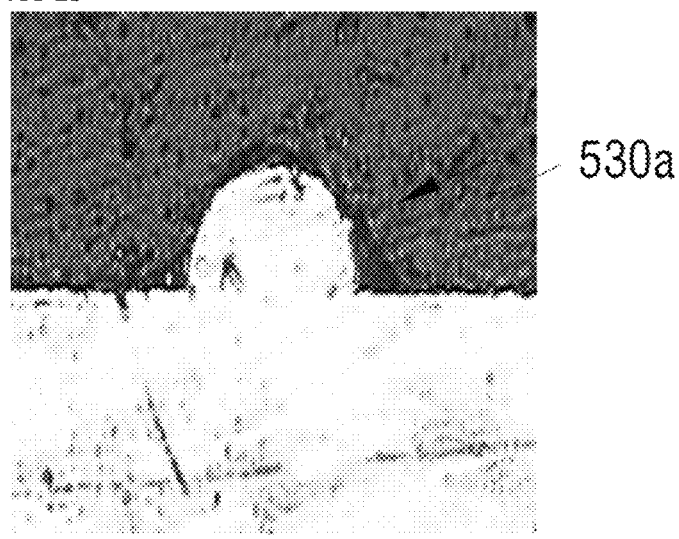
FIG. 25 is a picture illustrating a cross-section of a metal mesh pattern of the current collector for the rechargeable battery according to the fifth embodiment of the present invention.

FIG. 23 is a picture illustrating a cross-section of the metal mesh pattern of the current collector for the rechargeable battery according to the third embodiment of the present invention, FIG. 24 is a picture illustrating a cross-section of the metal mesh pattern of the current collector for the rechargeable battery according to the fourth embodiment of the present invention, and FIG. 25 is a picture illustrating a cross-section of the metal mesh pattern of the current collector for the rechargeable battery according to the fifth embodiment of the present invention.

As illustrated in FIGS. 23 to 25, the shapes of the metal mesh patterns of the metal mesh layers 330$a$, 430$a$, and 530$a$ may be formed as described with reference to FIGS. 20 to 22.

Figure 26:
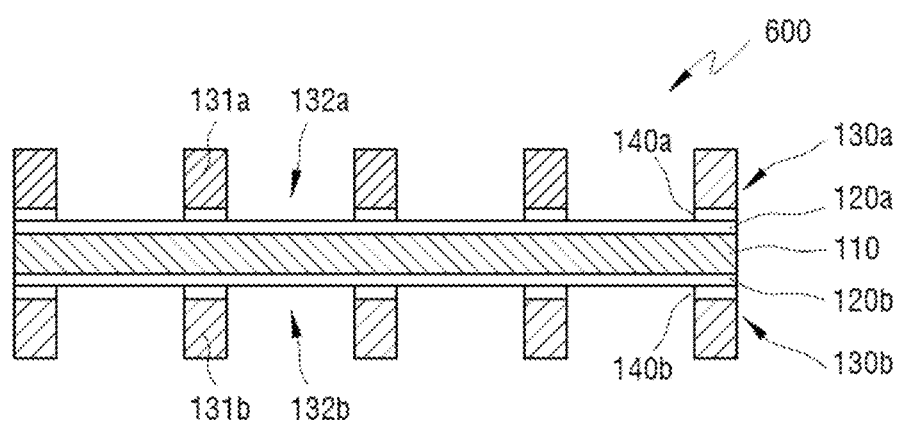
FIG. 26 is a cross-sectional view of a current collector for a rechargeable battery according to a sixth embodiment of the present invention.

FIG. 26 is a cross-sectional view of a current collector for a rechargeable battery according to a sixth embodiment of the present invention. In this case, the current collector for a rechargeable battery according to the sixth embodiment may be the same as the current collector for the rechargeable battery according to the first embodiment except for the matter to be described below.

Referring to FIG. 26, a current collector 600 for a rechargeable battery according to the sixth embodiment of the present invention includes metal mesh layers 130$a$ and 130$b$ formed on a first surface and a second surface of a base material 110, respectively, and each of the metal mesh layers includes a plurality of metal mesh patterns 131$a$ and 131$b$, and holes 132$a$ and 132$b$ positioned between the metal mesh patterns, and in this case, the current collector 600 include adhesive layers for attaching the base material and the metal mesh layers.

In this case, a structure of the adhesive layers in the current collector for the rechargeable battery according to the sixth embodiment of the present invention may be different from that of the current collector for the rechargeable battery according to the first embodiment of the present invention.

That is, as illustrated in FIG. 26, the adhesive layers include first adhesive layers 120$a$ and 120$b$ positioned on the first surface and the second surface of the base material 110, respectively, and second adhesive layers 140$a$ and 140$b$ positioned on the metal mesh layers 130$a$ and 130$b$, respectively, and the base material and the metal mesh layers may be attached through the attachment of the first adhesive layers 120$a$ and 120$b$ and the second adhesive layers 140$a$ and 140$b$.

Figure 27:
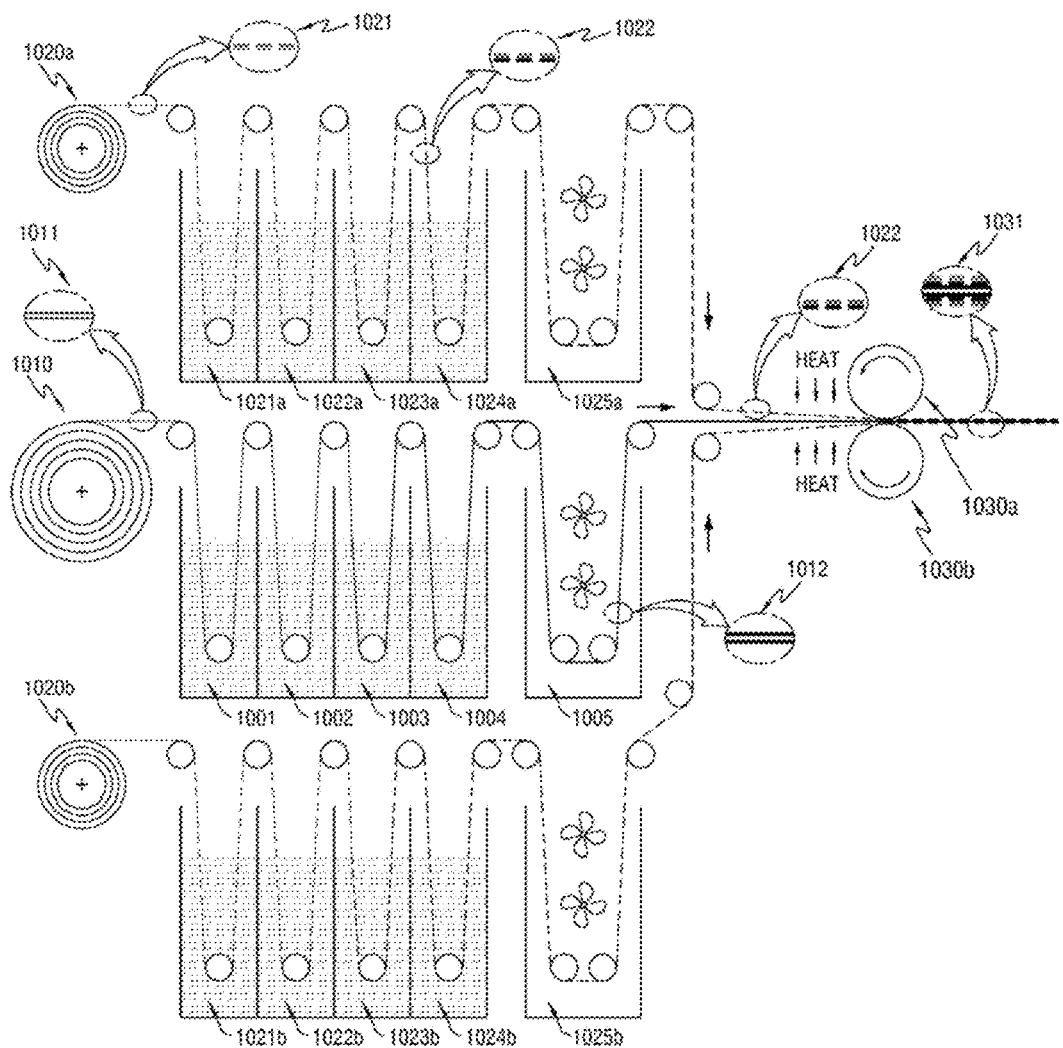
FIG. 27 is a configuration diagram schematically illustrating manufacturing of the current collector for the rechargeable battery according to the sixth embodiment of the present invention.
Figure 28:
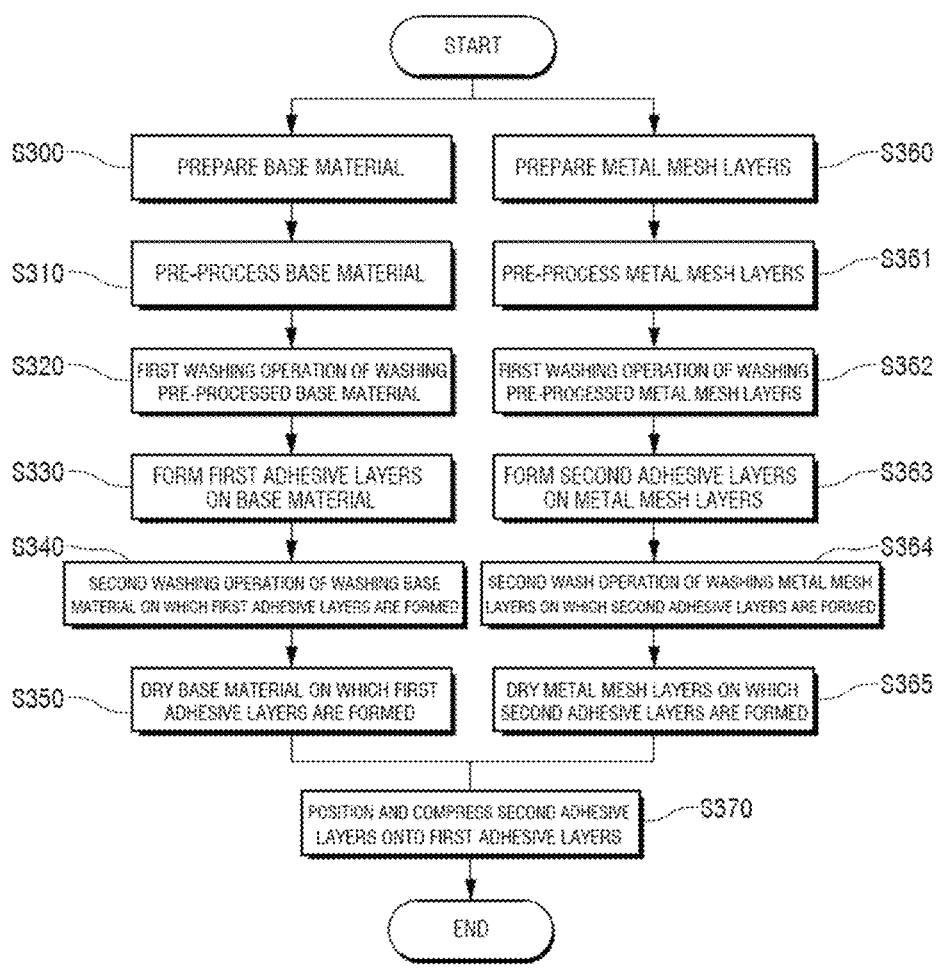
FIG. 28 is a process flowchart illustrating a method of manufacturing the current collector for the rechargeable battery according to the sixth embodiment of the present invention.

FIG. 27 is a configuration diagram schematically illustrating manufacturing of the current collector for the rechargeable battery according to the sixth embodiment of the present invention, and FIG. 28 is a process flowchart illustrating a method of manufacturing the current collector for the rechargeable battery according to the sixth embodiment of the present invention. In this case, a method of manufacturing the current collector for the rechargeable battery according to the sixth embodiment may be the same as the method of manufacturing the current collector for the rechargeable battery according to the first embodiment except for the matter to be described below.

Referring to FIGS. 27 and 28, in the method of manufacturing the current collector for the rechargeable battery according to the sixth embodiment of the present invention, a base material 1011 prepared by a base material supply unit 1010 is provided (S300).

The base material 1011 may be varied according to whether the current collector is a positive electrode current collector or a negative electrode current collector, which has been described above, so that a detailed description thereof will be omitted.

Next, the base material is pre-preprocessed (S310).

The pre-processing may be a chemical pre-processing method using a method of submerging the base material in a water tank 1001 for pre-processing in which a pre-processing solution is accommodated.

Next, a first washing operation of washing the pre-processed base material is performed (S320).

The first washing operation may be performed by a method of submerging the base material in a water tank 2602 for first washing in which a washing fluid is accommodated.

Next, first adhesive layers are formed on the base material (S330).

The first adhesive layer may be a solder layer, and the solder layer may be formed by a publicly known electro-plating method or electroless plating method using a method of submerging the base material in a water tank 1003 for plating including a plating liquid.

In this case, the solder layers may be formed on the first surface and the second surface of the base material, respectively.

Next, a second washing operation of washing the base material 1012, on which the first adhesive layers are formed, is performed (S340).

The second washing operation may be performed by a method of submerging the base material in a water tank 1004 for second washing in which a washing fluid is accommodated.

Next, an operation of drying the base material, on which the first adhesive layers are formed, is performed (S350).

The drying operation may be hot-air drying performed by a hot-air drying furnace 1005.

Subsequently, referring to FIGS. 27 and 28, a metal mesh layer 1021 is manufactured and provided by using the aforementioned metal mesh manufacturing device (S360).

In this case, as described above, the metal mesh layer may include the metal mesh patterns and the holes between the metal mesh patterns, and this has been described above, so that a detailed description thereof will be omitted.

In the meantime, as illustrated in FIG. 27, in the current collector for the rechargeable battery according to the sixth embodiment of the present invention, metal mesh layer supply units 1020$a$ and 1020$b$ may be positioned on the first surface and the second surface of the base material, respectively, in order to supply the metal mesh layers onto the first surface and the second surface of the base material.

Next, the metal mesh layers are pre-preprocessed (S361).

The pre-processing may be a general chemical pre-processing method, and the chemical pre-processing method may be a method, such as acid washing and fat removal, of removing oil, contaminants, and impurities on a surface of the metal material by submerging a target material, that is, the metal mesh layer in an acidic or alkaline solution or spraying the solution to the target material.

In the present invention, the pre-processing may be a chemical pre-processing method by a method of submerging the metal mesh layer in water tanks 1021a and 1021b for pre-processing in which the pre-processing solution is accommodated, but the pre-processing method is not limited in the present invention, and the pre-processing process may be omitted as necessary.

Next, a first washing operation of washing the pre-processed metal mesh layers is performed (S362).

The first washing operation, which is a process for removing the pre-processing solution and the like used in the pre-processing process, may be performed by a method of submerging the metal mesh layers in water tanks 1022a and 1022b for the first washing in which a washing fluid is accommodated, but the washing method is not limited in the present invention, and the first washing process may be omitted as necessary.

Next, second adhesive layers are formed on the metal mesh layers (S363).

The adhesive layer may be a solder layer, and the solder layer may be formed by a publicly known electroplating method or electroless plating method using the method of submerging the metal mesh layers in water tanks 1023a and 1023b for plating including a plating liquid, but the method of forming the solder layer is not limited in the present invention.

Next, a second washing operation of washing a metal mesh layer 1022, on which the second adhesive layers are formed, is performed (S364).

The second washing operation, which is a process for washing the plating liquid and the like used in the adhesive layer forming process, may be performed by a method of submerging the metal mesh layer in water tanks 1024a and 1024b for the second washing in which a washing fluid is accommodated, but the washing method is not limited in the present invention, and the second washing process may be omitted as necessary.

Next, an operation of drying the metal mesh layer, on which the second adhesive layers are formed, is performed (S365).

The drying operation may be hot-air drying performed by hot-air drying furnaces 1025a and 1025b, but the drying method is not limited in the present invention, and the drying process may be omitted as necessary.

Next, the base material including the first adhesive layers and the metal mesh layer including the second adhesive layers are disposed in such a manner than the second adhesive layers are positioned on the first adhesive layers, and the second adhesive layers and the first adhesive layers are compressed by compression rollers 1030a and 1030b (S370).

In this case, the first adhesive layer and the second adhesive layer may be compressed at a predetermined temperature in order to improve performance of adhesion of the adhesive layers, and the predetermined temperature may be 150 to 500° C.

Accordingly, it is possible to manufacture the current collector for the rechargeable battery including the metal mesh layer according to the sixth embodiment of the present invention.

That is, as illustrated in FIG. 26, in the current collector 600 for the rechargeable battery according to the sixth embodiment of the present invention, the adhesive layers include the first adhesive layers positioned on the first surface and the second surface of the base material, respectively, and the second adhesive layers positioned on the metal mesh layers, respectively, and the base material and the metal mesh layers may be attached through the attachment of the first adhesive layers and the second adhesive layers.

In the meantime, although it is not illustrated in the drawing, the metal mesh layer may be positioned on only any one surface of the first surface and the second surface of the base material in the sixth embodiment of the present invention, similar to the first embodiment of the present invention.

Figure 29:
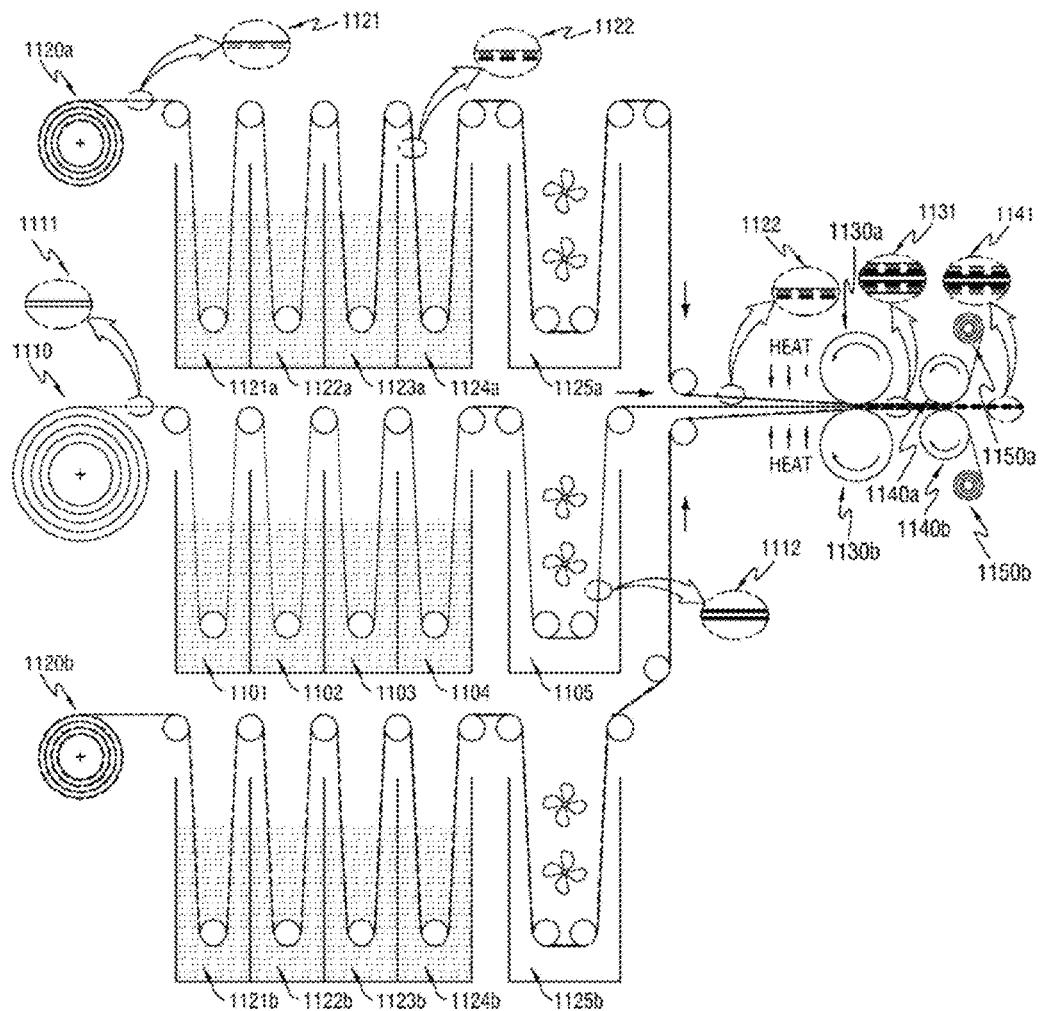
FIG. 29 is a configuration diagram schematically illustrating manufacturing of a current collector for a rechargeable battery according to a modified example of the sixth embodiment of the present invention.
Figure 30:
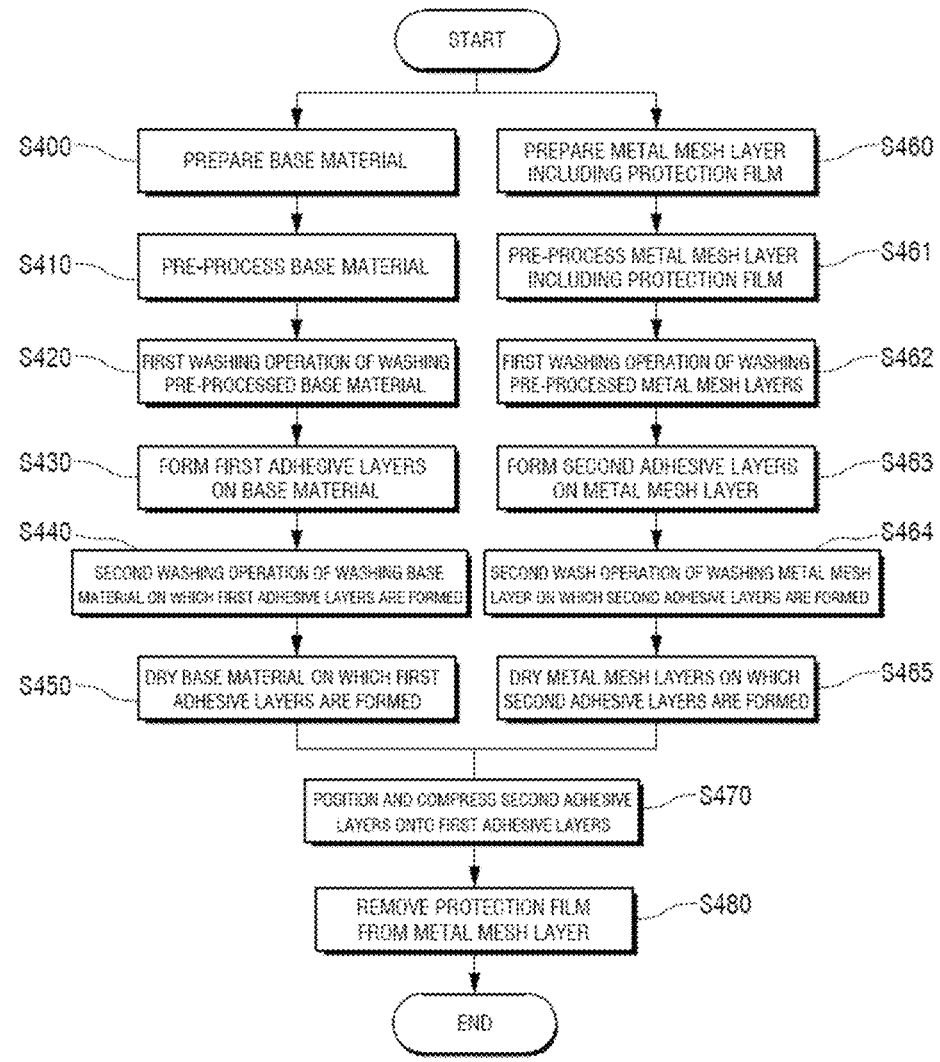
FIG. 30 is a process flowchart illustrating a method of manufacturing the current collector for the rechargeable battery according to the modified example of the sixth embodiment of the present invention.

FIG. 29 is a configuration diagram schematically illustrating manufacturing of a current collector for a rechargeable battery according to a modified example of the sixth embodiment of the present invention, and FIG. 30 is a process flowchart illustrating a method of manufacturing the current collector for the rechargeable battery according to the modified example of the sixth embodiment of the present invention. However, a method of manufacturing a current collector for a rechargeable battery according to a modified example of the sixth embodiment of the present invention may be the same as the method of manufacturing the current collector for the rechargeable battery according to the sixth embodiment of the present invention.

Referring to FIGS. 29 and 30, in the method of manufacturing the current collector for the rechargeable battery according to the modified example of the sixth embodiment of the present invention, a base material 1111 prepared by a base material supply unit 1110 is provided is provided (S400).

Next, the base material is pre-preprocessed (S410).

The pre-processing may be a chemical pre-processing method using a method of submerging the base material in a water tank 1101 for pre-processing in which a pre-processing solution is accommodated.

Next, a first washing operation of washing the pre-processed base material is performed (S420).

The first washing operation may be performed by a method of submerging the base material in a water tank 1102 for first washing in which a washing fluid is accommodated.

Next, first adhesive layers are formed on the base material (S430).

The first adhesive layer may be a solder layer, and the solder layer may be formed by a publicly known electroplating method or electroless plating method using a method of submerging the base material in a water tank 1103 for plating including a plating liquid.

In this case, the solder layers may be formed on the first surface and the second surface of the base material, respectively.

Next, a second washing operation of washing the base material 1112 on which the first adhesive layers are formed, is performed (S440).

The second washing operation may be performed by a method of submerging the base material in a water tank 1104 for second washing in which a washing fluid is accommodated.

Next, an operation of drying the base material, on which the adhesive layers are formed, is performed (S450).

The drying operation may be hot-air drying performed by a hot-air drying furnace 1105.

Subsequently, referring to FIGS. 29 and 30, a metal mesh layer 1121 including a protection film is manufactured and provided by using the aforementioned metal mesh manufacturing device (S460).

As described above, in the pre-deposited layer peeling operation of manufacturing the metal mesh layer, an adhesive may be applied onto the protection film, the protection film may be laminated on the metal mesh layer formed on the mesh of the surface of the mesh type negative electrode drum, and then the protection film and the metal mesh layer may be peeled together.

By contrast, only the metal mesh layer may be separated from the mesh of the mesh type negative electrode drum without a separate protection film, and in this case, the metal mesh, which is washed through the pre-deposited layer washing operation, may be attached to a separate protection film and used for easiness in the process.

The method of manufacturing the current collector for the rechargeable battery according to the modified example of the sixth embodiment of the present invention corresponds to the case where the metal mesh layer including the protection film is used.

Subsequently, referring to FIGS. 29 and 30, as described above, the metal mesh layer may include the metal mesh patterns and the holes between the metal mesh patterns, and this has been described above, so that a detailed description thereof will be omitted.

In the meantime, as illustrated in FIG. 29, in the current collector for the rechargeable battery according to the modified example of the sixth embodiment of the present invention, metal mesh layer supply units 1120a and 1120b may be positioned on the first surface and the second surface of the base material, respectively, in order to supply the metal mesh layer to the first surface and the second surface of the base material.

Next, the metal mesh layers are pre-preprocessed (S461).

The pre-processing may be a chemical pre-processing method using a method of submerging the mesh metal layers in water tanks 1121a and 1121b for pre-processing in which a pre-processing solution is accommodated.

Next, a first washing operation of washing the pre-processed metal mesh layers is performed (S462).

The first washing operation may be performed by a method of submerging the metal mesh layer in water tanks 1122a and 1122b for first washing in which a washing fluid is accommodated.

Next, second adhesive layers are formed on the metal mesh layers (S463).

The second adhesive layer may be a solder layer, and the solder layer may be formed by a publicly known electroplating method or electroless plating method using a method of submerging the metal mesh layer in water tanks 1123a and 1123b for plating including a plating liquid.

Next, a second washing operation of washing a metal mesh layer 1122 on which the second adhesive layers are formed, is performed (S464).

The second washing operation may be performed by a method of submerging the metal mesh layer in water tanks 1124a and 1124b for the second washing in which a washing fluid is accommodated, but the washing method is not limited in the present invention, and the second washing process may be omitted as necessary.

Next, an operation of drying the metal mesh layer, on which the second adhesive layers are formed, is performed (S465).

The drying operation may be hot-air drying performed by hot-air drying furnaces 1125a and 1125b, but the drying method is not limited in the present invention, and the drying process may be omitted as necessary.

Next, the base material including the first adhesive layers and the metal mesh layer including the second adhesive layers are disposed in such a manner than the second adhesive layers are positioned on the first adhesive layers, and the second adhesive layers and the first adhesive layers are compressed by compression rollers 1130a and 1130b (S470).

In this case, the first adhesive layer and the second adhesive layer may be compressed at a predetermined temperature in order to improve performance of adhesion of the adhesive layers, and the predetermined temperature may be 150 to 500° C.

In the meantime, in the current collector 1131 for the rechargeable battery, on which up to operation S470 is performed, the metal mesh layer includes the protection film, so that an opposing surface of the metal mesh layer, which is not attached to the adhesive layer, includes the protection film.

Accordingly, in the method of manufacturing the current collector for the rechargeable battery according to the modified example of the sixth embodiment of the present invention, the protection film is removed from the metal mesh layer during final use (S480).

Accordingly, it is possible to manufacture the current collector for the rechargeable battery including the metal mesh layer according to the modified example of the sixth embodiment of the present invention.

In the meantime, although it is not illustrated in the drawing, the metal mesh layer may be positioned on only any one surface of the first surface and the second surface of the base material in the modified example of the sixth embodiment of the present invention, similar to the first embodiment of the present invention.

Figure 31:
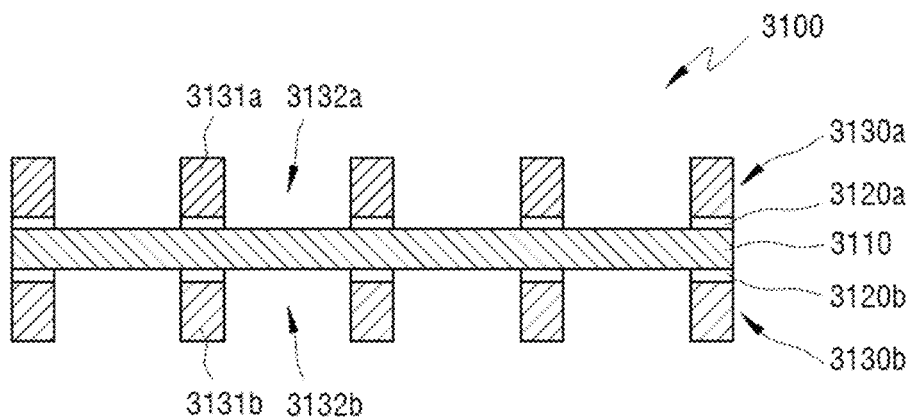
FIG. 31 is a cross-sectional view illustrating a current collector for a rechargeable battery according to a seventh embodiment of the present invention.
Figure 32:
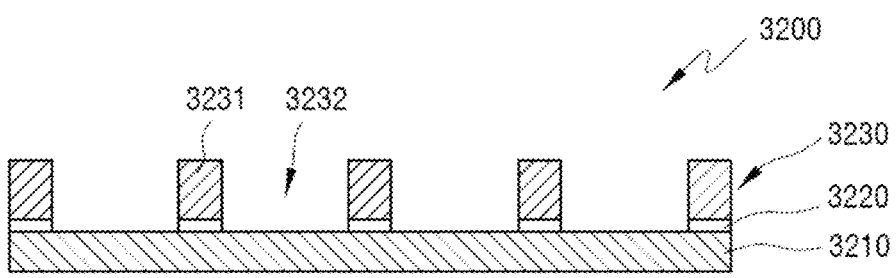
FIG. 32 is a cross-sectional view illustrating a current collector for a rechargeable battery according to an eighth embodiment of the present invention.

FIG. 31 is a cross-sectional view illustrating a current collector for a rechargeable battery according to a seventh embodiment of the present invention, and FIG. 32 is a cross-sectional view illustrating a current collector for a rechargeable battery according to an eighth embodiment of the present invention.

First, referring to FIG. 31, a current collector 3100 for a rechargeable battery according to a seventh embodiment of the present invention includes a base material 3110.

The base material 3110 may be varied according to whether the current collector is a positive electrode current collector or a negative electrode current collector.

Subsequently, referring to FIG. 31, the current collector 3100 for the rechargeable battery according to the seventh embodiment of the present invention includes a first metal mesh layer 3130a positioned on a first surface of the base material 3110, and a second metal mesh layer 3130b positioned on a second surface of the base material 3110.

The metal mesh layers 3130a and 3130b may be formed of at least one material among copper (Cu), silver (Ag), chrome (Cr), nickel (Ni), iron (Fe), cobalt (Co), and an alloy thereof, but a material of the metal mesh layer is not limited in the present invention.

In this case, the first metal mesh layer 3130a includes first holes 3132a positioned between a plurality of first metal mesh patterns 3131a, and the second metal mesh layer 3130b includes second holes 3132b positioned between a plurality of second metal mesh patterns 3131b.

Subsequently, referring to FIG. 31, the current collector 3100 for the rechargeable battery according to the seventh embodiment of the present invention includes a first adhesive layer 3120a positioned between the first surface of the base material 3110 and the first metal mesh layer 3130a, and a second adhesive layer 3120b positioned between the second surface of the base material 3110 and the second metal mesh layer 3130b.

More particularly, the first adhesive layer is positioned between the first surface of the base material 3110 and the first metal mesh patterns 3131a, the second adhesive layer is positioned between the second surface of the base material 3110 and the second metal mesh patterns 3131b.

The first adhesive layer 3120a and the second adhesive layer 3120b are provided for attaching the metal mesh layers onto the base material 110, and the first adhesive layer and the second adhesive layer may be solder layers, and in this case, the solder layer may be formed of lead (Pb), tin (Sn), zinc (Zn), indium (In), cadmium (Cd), bismuth (Bi), and an alloy thereof.

That is, the current collector 3100 for the rechargeable battery according to the seventh embodiment of the present invention includes the metal mesh layers 3130a and 3130b formed on the first surface and the second surface of the base material 3110, respectively, and each of the metal mesh layers includes the plurality of metal mesh patterns 3131a and 3131b, and the holes 3132a and 3132b positioned between the metal mesh patterns 3131a and 3131b, respectively, and in this case, the current collector 3100 includes the adhesive layers 3120a and 3120b for attaching the base material and the metal mesh layers.

As described above, the active material is deintercalated from the current collector due to degradation of the active material according to the repeat of charging and discharging several tens to several hundreds of times in the rechargeable battery having a general structure, so that battery efficiency deteriorates.

However, in the present invention, since the metal mesh layers are attached onto the current collector, on which the active material is coated, more particularly, the base material, through the adhesive layers, and the metal mesh layers include the holes 3132a and 3132b positioned between the metal mesh patterns, the active material is applied onto the metal mesh layers through the holes 3132a and 3132b, and thus contact areas of the metal mesh layers and the active material are increased, thereby restricting the active material from being deintercalated from the current collector and improving a cycle lifespan property of the battery.

In the present invention, the active material is applied onto the metal mesh layer, and in this case, the active material is also applied onto the base material through the holes positioned between the metal mesh patterns.

That is, the active material includes a region in which the active material is in direct contact with the base material, so that it is possible to prevent in and out of electrons and the like from being restricted by the adhesive layers in a charging and discharging process of the rechargeable battery.

Next, referring to FIG. 32, a current collector 3200 for a rechargeable battery according to an eighth embodiment of the present invention includes a base material 3210 and a metal mesh layer 3230 positioned on the base material 3210, and the metal mesh layer 3230 includes a plurality of metal mesh patterns 3231, and holes 3232 positioned between the metal mesh patterns 3231.

The current collector 3200 for the rechargeable battery according to the eighth embodiment of the present invention includes an adhesive layer 3220 positioned between the base material 3210 and the metal mesh patterns 3231.

As described above, in the rechargeable battery, for example, in a positive electrode, a positive electrode active material may be applied onto one surface or both surfaces of a positive electrode current collector.

That is, the current collector 3200 for the rechargeable battery according to the eighth embodiment of the present invention is an embodiment in which the metal mesh layer 3230 is formed on only one surface of the base material 3210, so that the metal mesh layer may be formed on a first surface and/or a second surface of the base material in the present invention.

The current collector for the rechargeable battery according to the eighth embodiment of the present invention may be the same as the current collector for the rechargeable battery according to the seventh embodiment of the present invention except for the aforementioned matter, so that a detailed description thereof will be omitted below.

FIGS. 33 to 36 are cross-sectional views illustrating a method of manufacturing the current collector for the rechargeable battery according to the seventh embodiment of the present invention.

Figure 33:
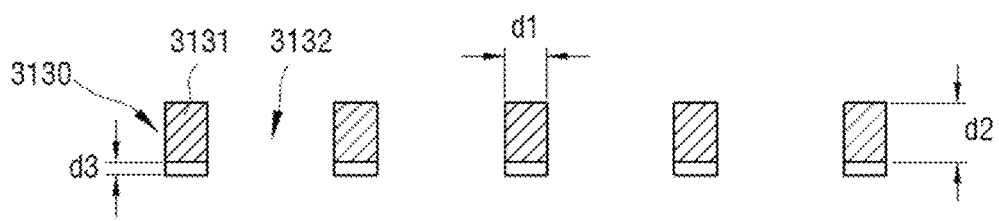
FIGS. 33 to 36 are cross-sectional views illustrating a method of manufacturing the current collector for the rechargeable battery according to the seventh embodiment of the present invention.

First, referring to FIG. 33, the metal mesh layer 3130 is manufactured by using the metal mesh manufacturing device as described above.

In the meantime, it has been described that the metal mesh layer is manufactured by an electroforming method using the continuous electroforming device, but, by contrast, the metal mesh layer may be manufactured by a weaving or mechanical processing method, and thus, the method of manufacturing the metal mesh layer is not limited in the present invention.

In this case, a width d1 of the metal mesh layer 3130 may be 1 to 500 μm, and a thickness d2 of the metal mesh layer may be 1 to 500 μm, and further, an interval between the metal mesh patterns, that is, a size of the hole 3132 positioned between the metal mesh patterns 3131 may be 1 μm to 3 mm, but numerical values thereof are not limited in the present invention.

Subsequently, referring to FIG. 33, the adhesive layer 3120 is formed on one surface of the metal mesh layer 3130.

The adhesive layer 3120 may be a solder layer, and the solder layer may be formed by a publicly known electroplating method or electroless plating method, but the method of forming the solder layer is not limited in the present invention.

In this case, a thickness d3 of the adhesive layer may be 1 to 20 μm, but the numerical value thereof is not limited in the present invention.

Figure 34:
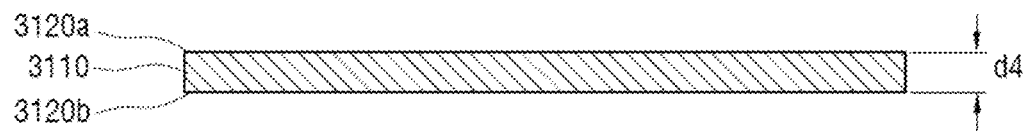

Next, referring to FIG. 34, the base material 3110 is prepared.

In this case, a thickness d4 of the base material 3110 may be 1 to 100 μm, but the numerical value thereof is not limited in the present invention.

Figure 35:
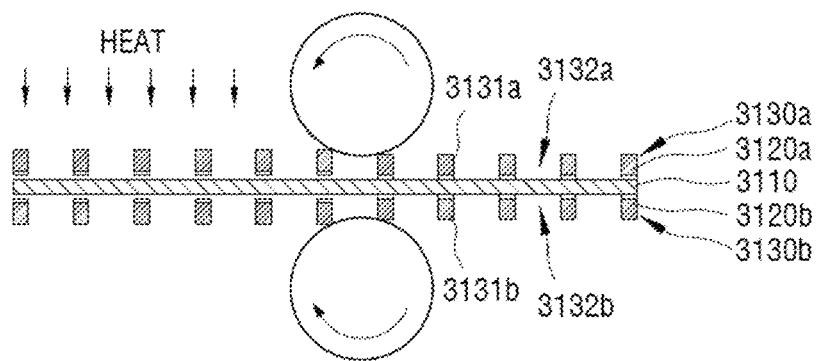

Next, referring to FIG. 35, the metal mesh layer including the adhesive layer formed on one surface thereof is positioned on the base material, and then the metal mesh layer is compressed onto the base material by the compression rollers.

More particularly, the first metal mesh layer 3130a including the first adhesive layer 3120a formed on one surface thereof may be positioned on the first surface of the base material, and the second metal mesh layer 3130b including the second adhesive layer 3120b formed on one surface thereof may be positioned on the second surface of the base material, and the metal mesh layers may be compressed by the compression rollers, so that the first metal mesh layer is formed on the first surface of the base material and the second metal mesh layer is formed on the second surface of the base material.

In this case, the first metal mesh layer and the second metal mesh layer may be compressed at a predetermined temperature in order to improve performance of adhesion of the adhesive layers and the base material, and the predetermined temperature may be 150 to 500° C.

Accordingly, it is possible to manufacture the current collector for the battery including the metal mesh layer according to the present invention.

Figure 36:
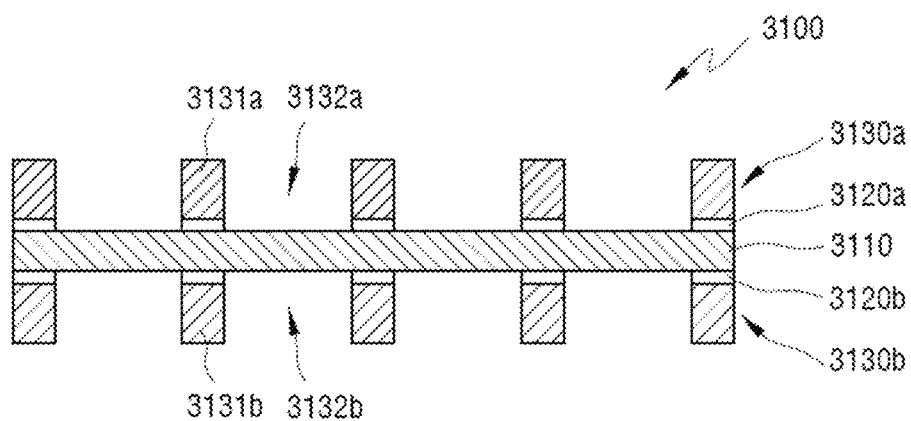

That is, as illustrated in FIG. 36, the current collector 3100 for the rechargeable battery according to the seventh embodiment of the present invention includes the metal mesh layers 3130a and 3130b formed on the first surface and the second surface of the base material 3110, respectively, and each of the metal mesh layers includes the plurality of metal mesh patterns 3131a and 3131b, and the holes 3132a and 3132b positioned between the metal mesh patterns, and in this case, the current collector 3100 includes the adhesive layers 3120a and 3120b for attaching the base material and the metal mesh layers.

Figure 37:
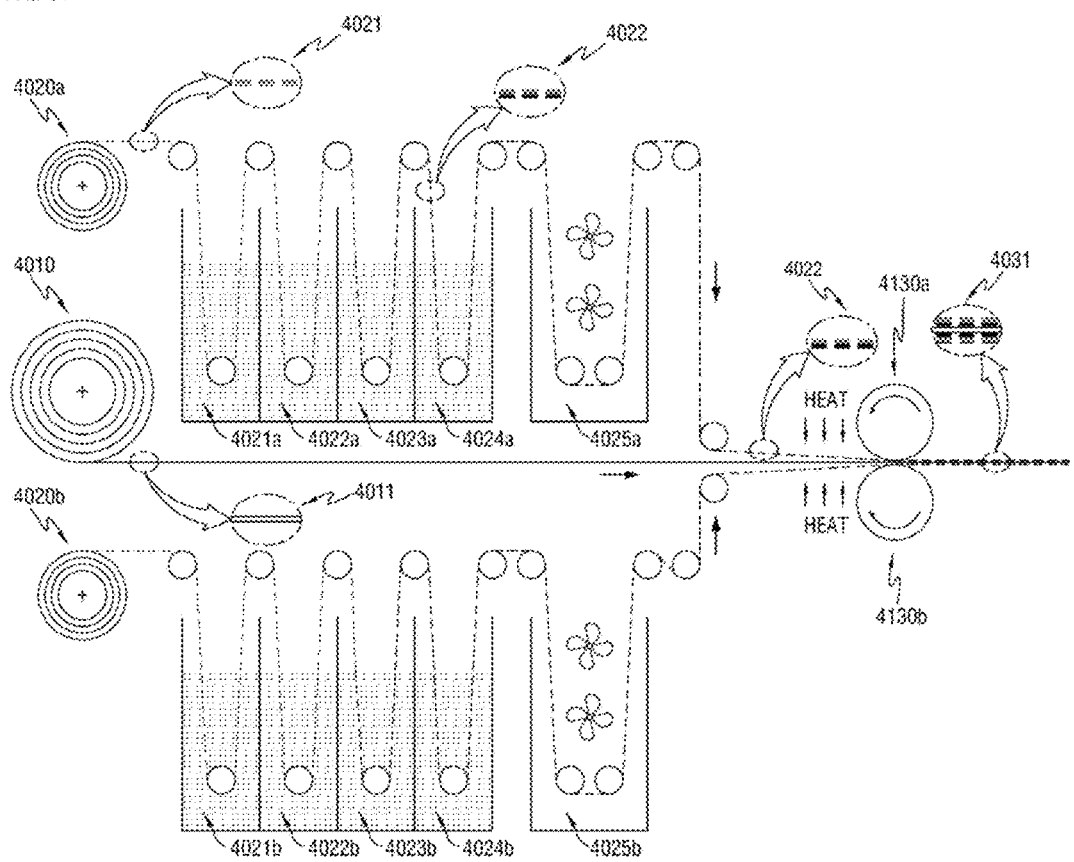
FIG. 37 is a configuration diagram schematically illustrating manufacturing of the current collector for the rechargeable battery according to the seventh embodiment of the present invention.
Figure 38:
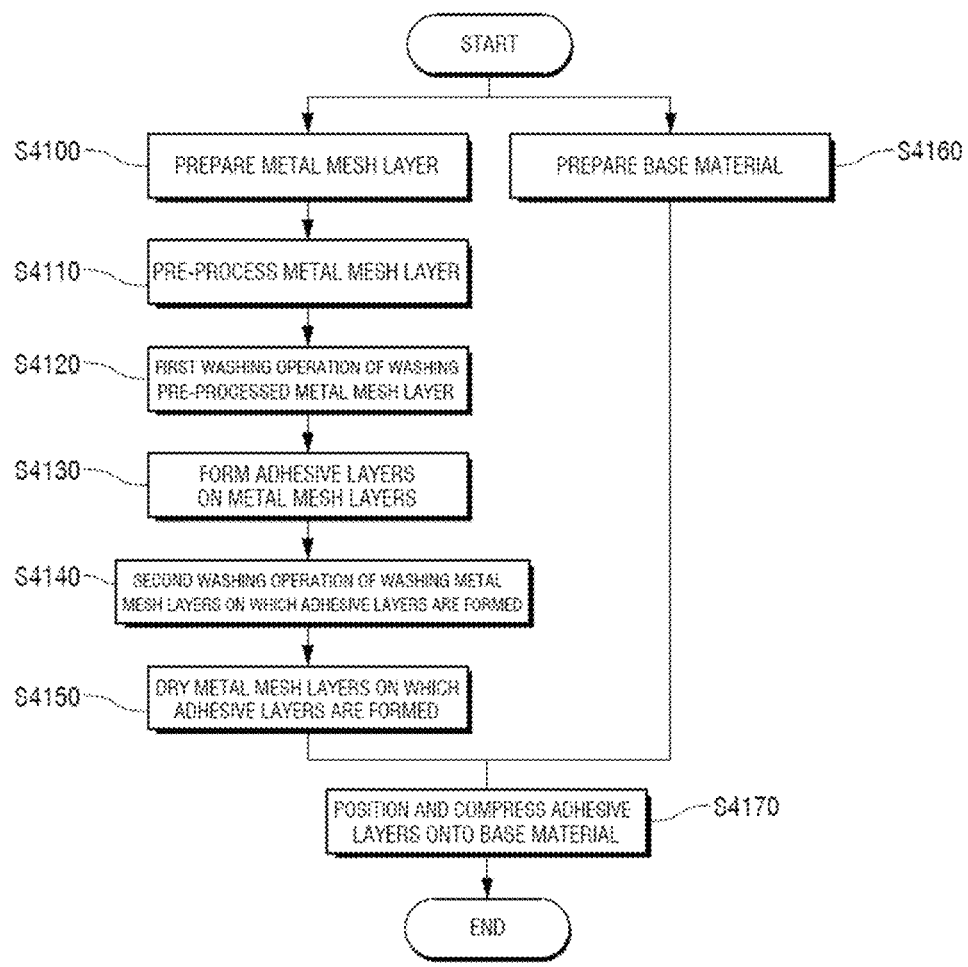
FIG. 38 is a process flowchart illustrating a method of manufacturing the current collector for the rechargeable battery according to the seventh embodiment of the present invention.
Figure 39:
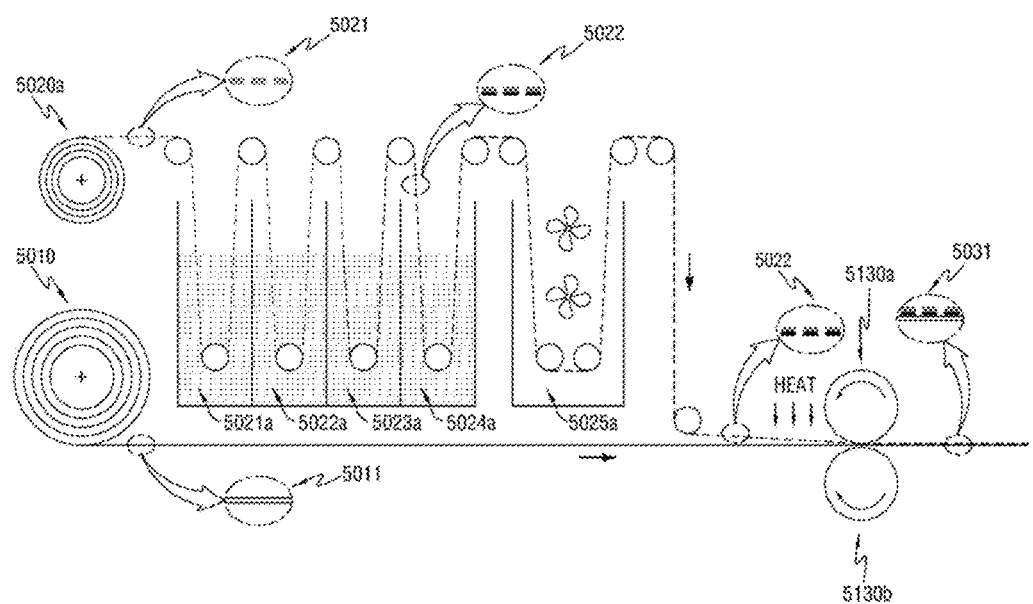
FIG. 39 is a configuration diagram schematically illustrating manufacturing of the current collector for the rechargeable battery according to the eighth embodiment of the present invention.

FIG. 37 is a configuration diagram schematically illustrating manufacturing of the current collector for the rechargeable battery according to the seventh embodiment of the present invention, FIG. 38 is a process flowchart illustrating a method of manufacturing the current collector for the rechargeable battery according to the seventh embodiment of the present invention, and FIG. 39 is a configuration diagram schematically illustrating manufacturing of the current collector for the rechargeable battery according to the eighth embodiment of the present invention. However, the method of manufacturing the current collector for the rechargeable battery according to the eighth embodiment of the present invention may be the same as the method of manufacturing the current collector for the rechargeable battery according to the seventh embodiment of the present invention except for the matter to be described below, and a particular process flowchart will be referred to FIG. 38.

First, referring to FIGS. 37 and 38, in the method of manufacturing the current collector for the rechargeable battery according to the seventh embodiment of the present invention, a metal mesh layer 4021 is manufactured and provided by using the aforementioned metal mesh manufacturing device (S4100).

In this case, as described above, the metal mesh layer may include the metal mesh patterns and the holes between the metal mesh patterns, and this has been described above, so that a detailed description thereof will be omitted.

In the meantime, as illustrated in FIG. 37, in the current collector for the rechargeable battery according to the seventh embodiment of the present invention, metal mesh layer supply units 4020a and 4020b may be positioned on the first surface and the second surface of the base material, respectively, in order to supply the metal mesh layers onto the first surface and the second surface of the base material.

That is, the current collector for the rechargeable battery according to the seventh embodiment of the present invention includes a first metal mesh layer supply unit 4020a for providing the first metal mesh layer onto the first surface of the base material, and a second metal mesh layer supply unit 4020b for providing the second metal mesh layer onto the second surface of the base material.

Hereinafter, the processes of forming the first metal mesh layer and the second metal mesh layer, which is to be performed below, are the same as each other, so that the first metal mesh layer and the second metal mesh layer are referred to as the metal mesh layer without being discriminated for convenience of the description.

Next, the metal mesh layers are pre-preprocessed (S4110).

The pre-processing may be a general chemical pre-processing method, and the chemical pre-processing method may be a method, such as acid washing and fat removal, of removing oil, contaminants, and impurities on a surface of the metal material by submerging a target material, that is, the metal mesh layer in an acidic or alkaline solution or spraying the solution to the target material.

In the present invention, the pre-processing may be a chemical pre-processing method by a method of submerging the metal mesh layer in water tanks 4021a and 4021b for pre-processing in which a pre-processing solution is accommodated, but the pre-processing method is not limited in the present invention, and the pre-processing process may be omitted as necessary.

Next, a first washing operation of washing the pre-processed metal mesh layers is performed (S4120).

The first washing operation, which is a process for removing the pre-processing solution and the like used in the pre-processing process, may be performed by a method of submerging the metal mesh layers in water tanks 4022a and 4022b for the first washing in which a washing fluid is accommodated, but the washing method is not limited in the present invention, and the first washing process may be omitted as necessary.

Next, adhesive layers are formed on the metal mesh layers (S4130).

The adhesive layer may be a solder layer, and the solder layer may be formed by a publicly known electroplating method or electroless plating method using the method of submerging the metal mesh layers in water tanks 4023a and 4023b for plating including a plating liquid, but the method of forming the solder layer is not limited in the present invention.

In this case, the first adhesive layer may be formed on the first metal mesh layer, and the second adhesive layer may be formed on the second metal mesh layer.

In the meantime, when the adhesive layers are formed by the method of submerging the metal mesh layers in the water tanks 4023a and 4023b for plating of operation S4130 illustrated in FIG. 37, the adhesive layers may be formed on both surfaces, that is, the first surface and the second surface, of the first metal mesh layer, and the adhesive layers may be formed on both surfaces, that is, the first surface and the second surface, of the second metal mesh layer.

As a matter of course, in the present invention, the adhesive layers may be formed on both surfaces of the metal mesh layer, but it is sufficient that the adhesive layer is formed on only one surface of the metal mesh layer in the present invention, so that the description will be given below based on that the adhesive layer is formed on only one surface of both surfaces of the metal mesh layer.

In the meantime, it is apparent that the adhesive layer may be selectively formed on only one surface of the metal mesh layer by a publicly known printing method, deposition method, and the like.

Next, a second washing operation of washing a metal mesh layer 4022, on which the adhesive layers are formed, is performed (S4140).

The second washing operation, which is a process for washing the plating liquid and the like used in the adhesive layer forming process, may be performed by a method of submerging the metal mesh layer in water tanks 4024a and 4024b for the second washing in which a washing fluid is accommodated, but the washing method is not limited in the present invention, and the second washing process may be omitted as necessary.

Next, an operation of drying the metal mesh layer, on which the adhesive layers are formed, is performed (S4150).

The drying operation may be hot-air drying performed by hot-air drying furnaces 4025*a* and 4025*b*, but the drying method is not limited in the present invention, and the drying process may be omitted as necessary.

Subsequently, referring to FIGS. 37 and 38, a base material 4011 prepared by a base material supply unit 4010 is provided (S4160).

The base material 4011 may be varied according to whether the current collector is a positive electrode current collector or a negative electrode current collector, which has been described above, so that a detailed description thereof will be omitted.

In the meantime, as described above, in the current collector for the rechargeable battery according to the seventh embodiment of the present invention, the metal mesh layer supply units 4020*a* and 4020*b* may be positioned on the first surface and the second surface of the base material, respectively, in order to supply the metal mesh layers onto the first surface and the second surface of the base material.

That is, the current collector for the rechargeable battery according to the seventh embodiment of the present invention includes the first metal mesh layer supply unit 4020*a* for providing the first metal mesh layer onto the first surface of the base material and the second metal mesh layer supply unit 4020*b* for providing the second metal mesh layer onto the second surface of the base material, and thus, the first metal mesh layer including the first adhesive layer may be provided onto the first surface of the base material and the second metal mesh layer including the second adhesive layer may be provided onto the second surface of the base material.

Next, the metal mesh layer 4022 including the adhesive layers is positioned on the base material, and the metal mesh layer 4022 is compressed by using compression rollers 4130*a* and 4130*b* (S4170).

In the current collector for the rechargeable battery according to the seventh embodiment of the present invention, the first metal mesh layer including the first adhesive layer is positioned on the first surface of the base material, and the second metal mesh layer including the second adhesive layer is positioned on the second surface of the base material, and then the first metal mesh layer and the second metal mesh layer may be compressed onto the first surface and the second surface of the base material through the first adhesive layer and the second adhesive layer by using the compression rollers, respectively.

In this case, the first metal mesh layer and the second metal mesh layer may be compressed at a predetermined temperature in order to improve performance of adhesion of the adhesive layers and the metal mesh layers, and the predetermined temperature may be 150 to 500° C.

Accordingly, it is possible to manufacture the current collector for the rechargeable battery including the metal mesh layer according to the seventh embodiment of the present invention.

That is, as illustrated in FIG. 36, the collector 4031 for the rechargeable battery according to the seventh embodiment of the present invention includes the metal mesh layers formed on the first surface and the second surface of the base material, respectively, and each of the metal mesh layers includes the plurality of metal mesh patterns and the holes positioned between the metal mesh patterns, and in this case, the current collector 4031 includes the adhesive layers for attaching the base material and the metal mesh layers.

Next, referring to FIG. 39, in the method of manufacturing the current collector for the rechargeable battery according to the eighth embodiment of the present invention, a metal mesh layer 5021 is manufactured and provided by using the metal mesh manufacturing device as described above.

In this case, as described above, the metal mesh layer may include the metal mesh patterns and the holes between the metal mesh patterns, and this has been described above, so that a detailed description thereof will be omitted.

In the meantime, as illustrated in FIG. 39, in the current collector for the rechargeable battery according to the eighth embodiment of the present invention, a metal mesh layer supply unit 5020*a* may be positioned only on the first surface of the base material in order to supply the metal mesh layer to any one surface of the first surface and the second surface of the base material, for example, the first surface.

That is, the current collector for the rechargeable battery according to the eighth embodiment of the present invention includes the metal mesh layer supply unit 5020*a* for providing the metal mesh layer onto the first surface of the base material.

As described above, in the rechargeable battery, for example, in a positive electrode, a positive electrode active material may be applied onto one surface or both surfaces of a positive electrode current collector.

That is, the method of manufacturing the current collector for the rechargeable battery according to the eighth embodiment of the present invention is an embodiment in which the metal mesh layer is formed on only one surface of the base material, so that the metal mesh layer may be formed on the first surface and/or the second surface of the base material in the present invention.

Next, the metal mesh layers are pre-preprocessed.

The pre-processing may be a chemical pre-processing method using a method of submerging the mesh metal layers in a water tank 2021*a* for pre-processing in which a pre-processing solution is accommodated.

Next, a first washing operation of washing the pre-processed metal mesh layers is performed.

The first washing operation may be performed by a method of submerging the metal mesh layer in a water tank 5022*a* for first washing in which a washing fluid is accommodated.

Next, adhesive layers are formed on the metal mesh layer.

The adhesive layer may be a solder layer, and the solder layer may be formed by a publicly known electroplating method or electroless plating method using a method of submerging the metal mesh layer in a water tank 5023*a* for plating including a plating liquid.

Next, a second washing operation of washing a metal mesh layer 5022, on which the adhesive layers are formed, is performed.

The second washing operation may be performed by a method of submerging the metal mesh layer in a water tank 5024*a* for second washing in which a washing fluid is accommodated.

Next, an operation of drying the metal mesh layer, on which the adhesive layers are formed, is performed.

The drying operation may be hot-air drying performed by a hot-air drying furnace 5025*a*.

Subsequently, referring to FIG. 39, a base material 5010 prepared by a base material supply unit 5010 is provided.

The base material 5011 may be varied according to whether the current collector is a positive electrode current collector or a negative electrode current collector, which has been described above, so that a detailed description thereof will be omitted.

In the meantime, as described above, in the current collector for the rechargeable battery according to the eighth embodiment of the present invention, the metal mesh layer supply unit 5020*a* may be positioned only on the first surface of the base material in order to supply the metal mesh layer onto the first surface of the base material.

Next, the metal mesh layer 5022 including the adhesive layer is positioned on the base material, and the metal mesh layer 5022 is compressed by using compression rollers 5130*a* and 5130*b*.

In the current collector for the rechargeable battery according to the eighth embodiment of the present invention, the metal mesh layer including the adhesive layers may be positioned on the first surface of the base material, and the metal mesh layer may be compressed onto the first surface of the base material through the adhesive layer by using the compression rollers.

In this case, the metal mesh layer may be compressed at a predetermined temperature in order to improve performance of adhesion of the adhesive layer and the metal mesh layer, and the predetermined temperature may be 150 to 500° C.

Accordingly, it is possible to manufacture the current collector for the rechargeable battery including the metal mesh layer according to the eighth embodiment of the present invention.

That is, as illustrated in FIG. 32, the collector 5031 for the rechargeable battery according to the eighth embodiment of the present invention includes the metal mesh layer formed on the first surface of the base material, and the metal mesh layer includes the plurality of metal mesh patterns and the holes positioned between the metal mesh patterns, and in this case, the current collector 5031 includes the adhesive layer for attaching the base material and the metal mesh layer.

Figure 40:
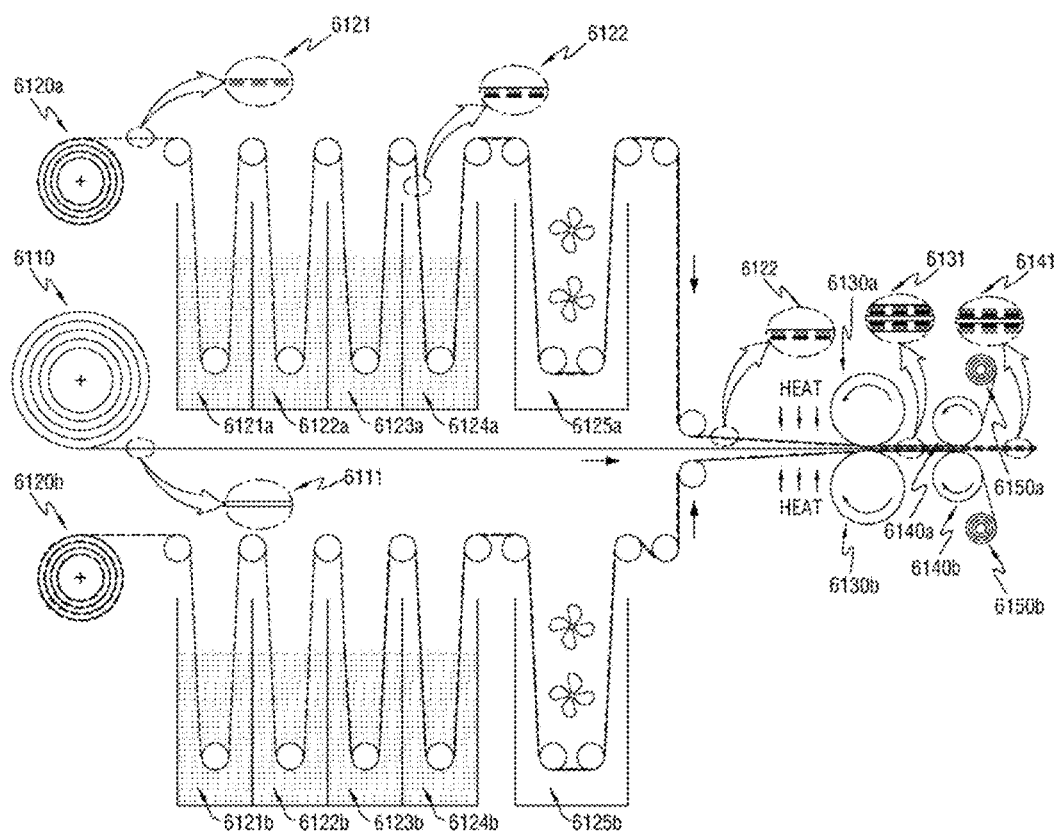
FIG. 40 is a configuration diagram schematically illustrating manufacturing of a current collector for a rechargeable battery according to a modified example of the seventh embodiment of the present invention.
Figure 41:
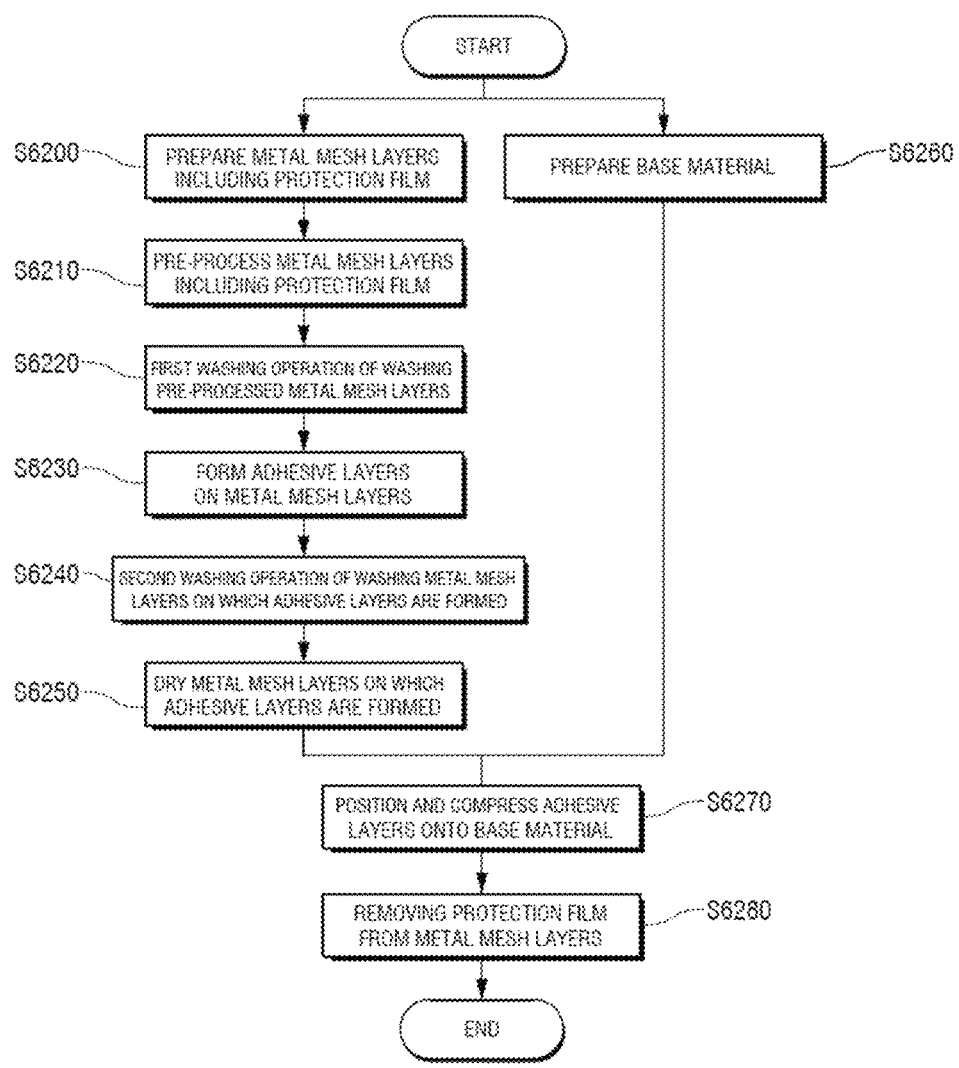
FIG. 41 is a process flowchart illustrating a method of manufacturing the current collector for the rechargeable battery according to the modified example of the seventh embodiment of the present invention.
Figure 42:
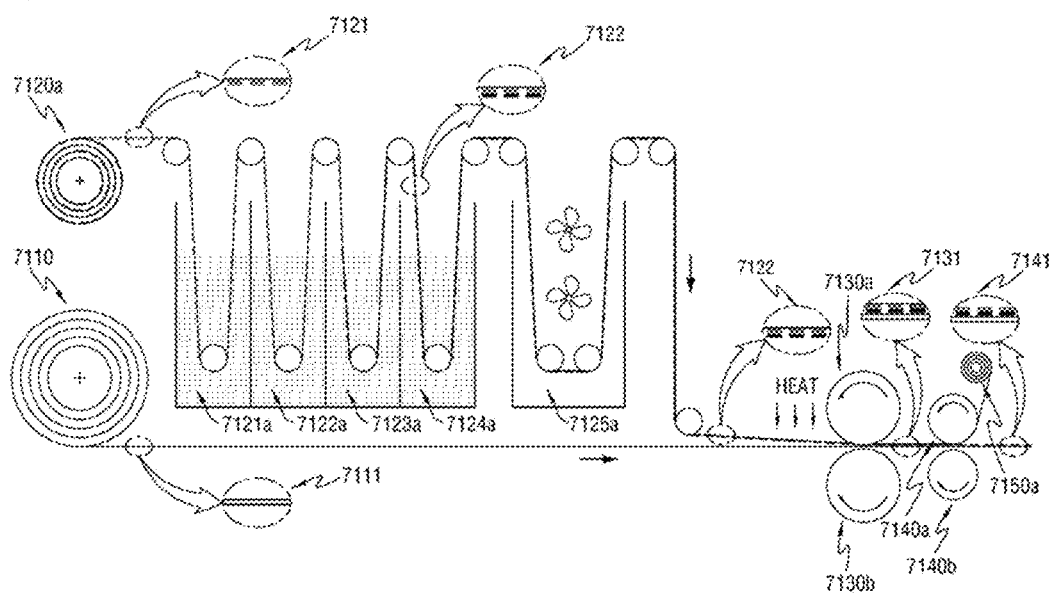
FIG. 42 is a configuration diagram schematically illustrating manufacturing of the current collector for the rechargeable battery according to the modified example of the eighth embodiment of the present invention.

FIG. 40 is a configuration diagram schematically illustrating manufacturing of a current collector for a rechargeable battery according to a modified example of the seventh embodiment of the present invention, FIG. 41 is a process flowchart illustrating a method of manufacturing the current collector for the rechargeable battery according to the modified example of the seventh embodiment of the present invention, and FIG. 42 is a configuration diagram schematically illustrating manufacturing of the current collector for the rechargeable battery according to the modified example of the eighth embodiment of the present invention. However, a method of manufacturing a current collector for a rechargeable battery according to a modified example of the seventh embodiment of the present invention may be the same as the method of manufacturing the current collector for the rechargeable battery according to the seventh embodiment of the present invention. However, a method of manufacturing of a current collector for a rechargeable battery according to a modified example of the eighth embodiment of the present invention may be the same as the method of manufacturing the current collector for the rechargeable battery according to the modified of the seventh embodiment of the present invention except for the matter to be described below, and a particular process flowchart will be referred to FIG. 41.

First, referring to FIGS. 40 and 41, in a method of manufacturing the current collector for the rechargeable battery according to a modified example of the seventh embodiment of the present invention, a metal mesh layer 6121 including a protection film is manufactured and provided by using the aforementioned metal mesh manufacturing device (S6200).

As described above, in the pre-deposited layer peeling operation of manufacturing the metal mesh layer, an adhesive may be applied onto the protection film, the protection film may be laminated on the metal mesh layer formed on the mesh of the surface of the mesh type negative electrode drum, and then the protection film and the metal mesh layer may be peeled together.

By contrast, only the metal mesh layer may be separated from the mesh of the surface of the mesh type negative electrode drum without a separate protection film, and in this case, the metal mesh, which is washed through the pre-deposited layer washing operation, may be attached to a separate protection film and used for easiness in the process.

The method of manufacturing the current collector for the rechargeable battery according to the modified example of the seventh embodiment of the present invention corresponds to the case where the metal mesh layer including the protection film is used.

Subsequently, referring to FIGS. 40 and 41, the metal mesh layer may include the metal mesh patterns and the holes between the metal mesh patterns, and this has been described above, so that a detailed description thereof will be omitted.

In the meantime, as illustrated in FIG. 40, in the current collector for the rechargeable battery according to the modified example of the seventh embodiment of the present invention, metal mesh layer supply units 6120*a* and 6120*b* may be positioned on the first surface and the second surface of the base material, respectively, in order to supply the metal mesh layer to the first surface and the second surface of the base material.

That is, the current collector for the rechargeable battery according to the modified example of the seventh embodiment of the present invention includes a first metal mesh layer supply unit 6120*a* for providing the first metal mesh layer onto the first surface of the base material, and a second metal mesh layer supply unit 6120*b* for providing the second metal mesh layer onto the second surface of the base material.

Hereinafter, the processes of forming the first metal mesh layer and the second metal mesh layer, which is to be performed below, are the same as each other, so that, for convenience of the description, the first metal mesh layer and the second metal mesh layer are referred to as the metal mesh layer without being discriminated.

Next, the metal mesh layers are pre-preprocessed (S6210).

The pre-processing may be a chemical pre-processing method using a method of submerging the mesh metal layers in water tanks 6121*a* and 6121*b* for pre-processing in which a pre-processing solution is accommodated.

Next, a first washing operation of washing the pre-processed metal mesh layers is performed (S6220).

The first washing operation may be performed by a method of submerging the metal mesh layer in water tanks 6122*a* and 6122*b* for first washing in which a washing fluid is accommodated.

Next, adhesive layers are formed on the metal mesh layers (S6230).

The adhesive layer may be a solder layer, and the solder layer may be formed by a publicly known electroplating method or electroless plating method using a method of submerging the metal mesh layer in water tank 6123*a* and 6123*b* for plating including a plating liquid.

In this case, the first adhesive layer may be formed on the first metal mesh layer, and the second adhesive layer may be formed on the second metal mesh layer.

Next, a second washing operation of washing a metal mesh layer 6122, on which the adhesive layers are formed, is performed (S6240).

The second washing operation may be performed by a method of submerging the metal mesh layer in water tanks 6124a and 6124b for second washing in which a washing fluid is accommodated.

Next, an operation of drying the metal mesh layer, on which the adhesive layers are formed, is performed (S6250).

The drying operation may be hot-air drying performed by hot-air drying furnaces 6125a and 6125b.

Subsequently, referring to FIGS. 40 and 41, a base material 6111 prepared by a base material supply unit 6110 is provided (S6260).

The base material 6111 may be varied according to whether the current collector is a positive electrode current collector or a negative electrode current collector, which has been described above, so that a detailed description thereof will be omitted.

In the meantime, as described above, in the current collector for the rechargeable battery according to the modified example of the seventh embodiment of the present invention, the metal mesh layer supply units 6120a and 6120b may be positioned on the first surface and the second surface of the base material, respectively, in order to supply the metal mesh layers onto the first surface and the second surface of the base material.

That is, the first metal mesh layer including the first adhesive layer may be provided onto the first surface of the base material, and the second metal mesh layer including the second adhesive layer may be provided onto the second surface of the base material.

Next, the metal mesh layer 6122 including the adhesive layers is positioned on the base material, and the metal mesh layer 6122 is compressed by using compression rollers 6130a and 6130b (S6270).

When the metal mesh layer including the adhesive layers is positioned on the base material, the adhesive layer positioned on an opposing surface, on which the protection film is positioned, is positioned on the base material.

In the current collector for the rechargeable battery according to the modified example of the seventh embodiment of the present invention, the first metal mesh layer including the first adhesive layer is positioned on the first surface of the base material, and the second metal mesh layer including the second adhesive layer is positioned on the second surface of the base material, and then the first metal mesh layer and the second metal mesh layer may be compressed onto the first surface and the second surface of the base material through the first adhesive layer and the second adhesive layer by using the compression rollers, respectively.

In this case, the first metal mesh layer and the second metal mesh layer may be compressed at a predetermined temperature in order to improve performance of adhesion of the adhesive layers and the metal mesh layers, and the predetermined temperature may be 150 to 500° C.

In the meantime, in the current collector 6131 for the rechargeable battery, on which up to operation S6270 is performed, the metal mesh layer includes the protection film, so that the opposing surface of the metal mesh layer, which is not attached to the base material, includes the protection film.

Accordingly, in the method of manufacturing the current collector for the rechargeable battery according to the modified example of the seventh embodiment of the present invention, the protection film is removed from the metal mesh layer during final use (S6280).

In the meantime, compared to the seventh embodiment, in the modified example of the seventh embodiment, the protection film is included on the metal mesh layer, more particularly, on the opposing surface of the metal mesh layer, which is not attached to the base material, so that it is possible to easily achieve a protection property and a storage property of the current collector for the rechargeable battery.

Accordingly, it is possible to manufacture the current collector for the rechargeable battery including the metal mesh layer according to the modified example of the seventh embodiment of the present invention.

Next, referring to FIG. 42, in a method of manufacturing a current collector for a rechargeable battery according to a modified example of the eighth embodiment of the present invention, a metal mesh layer 7121 including a protection film is prepared and provided.

In this case, as described above, the metal mesh layer may include the metal mesh patterns and the holes between the metal mesh patterns, and this has been described above, so that a detailed description thereof will be omitted.

In the meantime, as illustrated in FIG. 42, in the current collector for the rechargeable battery according to the modified example of the eighth embodiment of the present invention, a metal mesh layer supply unit 7120a may be positioned only on the first surface of the base material in order to supply the metal mesh layer to any one surface of the first surface and the second surface of the base material, for example, the first surface.

That is, the current collector for the rechargeable battery according to the modified example of the eighth embodiment of the present invention includes the metal mesh layer supply unit 7120a for providing the metal mesh layer onto the first surface of the base material.

As described above, in the rechargeable battery, for example, in a positive electrode, a positive electrode active material may be applied onto one surface or both surfaces of a positive electrode current collector.

That is, the method of manufacturing the current collector for the rechargeable battery according to the modified example of the eighth embodiment of the present invention is an embodiment in which the metal mesh layer is formed on only one surface of the base material, so that the metal mesh layer may be formed on the first surface and/or the second surface of the base material in the present invention.

Next, the metal mesh layer is pre-preprocessed.

The pre-processing may be a chemical pre-processing method using a method of submerging the mesh metal layers in a water tank 7121a for pre-processing in which a pre-processing solution is accommodated.

Next, a first washing operation of washing the pre-processed metal mesh layers is performed.

The first washing operation may be performed by a method of submerging the base material in a water tank 7122a for first washing in which a washing fluid is accommodated.

Next, adhesive layers are formed on the metal mesh layer.

The adhesive layer may be a solder layer, and the solder layer may be formed by a publicly known electroplating method or electroless plating method using a method of submerging the metal mesh layer in a water tank 7123a for plating including a plating liquid.

Next, a second washing operation of washing a metal mesh layer 7122, on which the adhesive layers are formed, is performed.

The second washing operation may be performed by a method of submerging the metal mesh layer in a water tank 7124*a* for second washing in which a washing fluid is accommodated.

Next, an operation of drying the metal mesh layer, on which the adhesive layers are formed, is performed.

The drying operation may be hot-air drying performed by a hot-air drying furnace 7125*a*.

Subsequently, referring to FIG. 42, a base material 7111 prepared by a base material supply unit 7110 is provided.

The base material 7111 may be varied according to whether the current collector is a positive electrode current collector or a negative electrode current collector, which has been described above, so that a detailed description thereof will be omitted.

In the meantime, as described above, in the current collector for the rechargeable battery according to the modified example of the eighth embodiment of the present invention, the metal mesh layer supply unit 7120*a* may be positioned only on the first surface of the base material in order to supply the metal mesh layer onto the first surface of the base material.

Next, the metal mesh layer 7122 including the adhesive layers is positioned on the base material, and the metal mesh layer 7122 is compressed by using compression rollers 7130*a* and 7130*b*.

In the current collector for the rechargeable battery according to the modified example of the eighth embodiment of the present invention, the metal mesh layer including the adhesive layers may be positioned on the first surface of the base material, and the metal mesh layer may be compressed onto the first surface of the base material through the adhesive layers by using the compression rollers.

In this case, the metal mesh layer may be compressed at a predetermined temperature in order to improve performance of adhesion of the adhesive layer and the metal mesh layer, and the predetermined temperature may be 150 to 500° C.

In the meantime, as described above, in the current collector 7131 for the rechargeable battery, on which up to the above operation is performed, the metal mesh layer includes the protection film, so that the opposing surface of the metal mesh layer, which is not attached to the base material, includes the protection film.

Accordingly, in the method of manufacturing the current collector for the rechargeable battery according to the modified example of the eighth embodiment of the present invention, the protection film is removed from the metal mesh layer during final use.

In the meantime, compared to the eighth embodiment, in the modified example of the eighth embodiment, the protection film is included on the metal mesh layer, more particularly, on the opposing surface of the metal mesh layer, which is not attached to the base material, so that it is possible to easily achieve a protection property and a storage property of the current collector for the rechargeable battery.

Accordingly, it is possible to manufacture the current collector for the rechargeable battery including the metal mesh layer according to the modified example of the eighth embodiment of the present invention.

In the meantime, although it is not illustrated in the drawings, the shape of the metal mesh pattern may be varied even in the seventh and eighth embodiments of the present invention, as illustrated in FIGS. 20 to 22.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A current collector for a battery, comprising:
a base material;
adhesive layers positioned on the base material; and
metal mesh layers positioned on the adhesive layers,
wherein the metal mesh layers include a plurality of metal mesh patterns, and holes positioned between the plurality of metal mesh patterns,
the plurality of metal mesh patterns include a lower end and an upper end,
the lower end is in contact with a contact surface of the adhesive layers,
the upper end is located on a distal side of the contact surface,
the upper end is not in contact with the contact surface, and
a width of the upper end is greater than a width of the lower end.

2. The current collector of claim 1, wherein the adhesive layers are a solder layer, and the solder layer is be formed of lead (Pb), tin (Sn), zinc (Zn), indium (In), cadmium (Cd), bismuth (Bi), or an alloy thereof.

3. The current collector of claim 1, wherein the adhesive layers include a first adhesive layer and a second adhesive layer, and the metal mesh layers include a first metal mesh layer and a second metal mesh layer,
the first adhesive layer is positioned on a first surface of the base material, and the second adhesive layer is positioned on a second surface of the base material, and
the first metal mesh layer is positioned on the first adhesive layer and the second metal mesh layer is positioned on the second adhesive layer.

4. The current collector of claim 1, wherein an active material is applied onto the adhesive layers through the holes positioned between the metal mesh patterns.

5. A current collector for a battery, comprising:
a base material;
metal mesh layers formed on a first surface and a second surface of the base material, respectively, and each of the metal mesh layers includes a plurality of metal mesh patterns and holes positioned between the plurality of metal mesh patterns; and
adhesive layers configured to attach the base material and the metal mesh layers,
wherein the adhesive layers include first adhesive layers positioned on the first surface and the second surface of the base material, respectively, and second adhesive layers positioned on the metal mesh layers, and the first adhesive layers and the second adhesive layers are attached,
the plurality of metal mesh patterns include a lower end and an upper end, the lower end is in contact with a contact surface of the adhesive layers,
the upper end is located on a distal side of the contact surface,
the upper end is not in contact with the contact surface, and
a width of the upper end is greater than a width of the lower end.

6. A current collector for a battery, comprising:
a base material;
metal mesh layers positioned on the base material; and
adhesive layers positioned between the base material and the metal mesh layers,
wherein the metal mesh layers include a plurality of metal mesh patterns, and holes positioned between the plurality of metal mesh patterns,
the plurality of metal mesh patterns include a lower end and an upper end,
the lower end is in contact with a contact surface of the adhesive layers,
the upper end is located on a distal side of the contact surface,
the upper end is not in contact with the contact surface, and
a width of the upper end is greater than a width of the lower end.

7. The current collector of claim 6, wherein the adhesive layers are a solder layer, and the solder layer is formed of lead (Pb), tin (Sn), zinc (Zn), indium (In), cadmium (Cd), bismuth (Bi), or an alloy thereof.

8. The current collector of claim 6, wherein the adhesive layers include a first adhesive layer and a second adhesive layer, and the metal mesh layers include a first metal mesh layer and a second metal mesh layer, and
the first adhesive layer is positioned between a first surface of the base material and the first metal mesh layer, and the second adhesive layer is positioned between a second surface of the base material and the second metal mesh layer.

9. The current collector of claim 6, wherein the adhesive layers include a first adhesive layer and a second adhesive layer, and the metal mesh layers include a first metal mesh layer and a second metal mesh layer,
the first metal mesh layer includes a plurality of first metal mesh patterns, and the second metal mesh layer includes a plurality of second metal mesh patterns, and
the first adhesive layer is positioned between a first surface of the base material and the first metal mesh pattern, and the second adhesive layer is positioned between a second surface of the base material and the second metal mesh pattern.

10. The current collector of claim 6, wherein an active material is applied onto the base material through the holes positioned between the metal mesh patterns.

11. A current collector for a battery, comprising:
a base material;
adhesive layers positioned on the base material; and
metal mesh layers positioned on the adhesive layers,
wherein the metal mesh layers include a plurality of metal mesh patterns, and holes positioned between the plurality of metal mesh patterns,
the plurality of metal mesh patterns include a lower end and an upper end,
the lower end is in contact with a contact surface of the adhesive layers,
the upper end is located on a distal side of the contact surface,
the upper end is not in contact with the contact surface, and
the width of the metal mesh pattern is increased from the lower end to the upper end.

12. A current collector for a battery, comprising:
a base material;
metal mesh layers formed on a first surface and a second surface of the base material, respectively, and each of the metal mesh layers includes a plurality of metal mesh patterns and holes positioned between the plurality of metal mesh patterns; and
adhesive layers configured to attach the base material and the metal mesh layers,
wherein the adhesive layers include first adhesive layers positioned on the first surface and the second surface of the base material, respectively, and second adhesive layers positioned on the metal mesh layers, and the first adhesive layers and the second adhesive layers are attached,
the plurality of metal mesh patterns include a lower end and an upper end,
the lower end is in contact with a contact surface of the adhesive layers,
the upper end is located on a distal side of the contact surface,
the upper end is not in contact with the contact surface, and
the width of the metal mesh pattern is increased from the lower end to the upper end.

13. A current collector for a battery, comprising:
a base material;
metal mesh layers positioned on the base material; and
adhesive layers positioned between the base material and the metal mesh layers,
wherein the metal mesh layers include a plurality of metal mesh patterns, and holes positioned between the plurality of metal mesh patterns,
the plurality of metal mesh patterns include a lower end and an upper end,
the lower end is in contact with a contact surface of the adhesive layers,
the upper end is located on a distal side of the contact surface,
the upper end is not in contact with the contact surface, and
the width of the metal mesh pattern is increased from the lower end to the upper end.

* * * * *